United States Patent [19]

Schneider et al.

[11] Patent Number: 4,585,948
[45] Date of Patent: Apr. 29, 1986

[54] NON-SCANNING INTEGRATED OPTICAL SYSTEM WITH WIDE FIELD OF VIEW SEARCH CAPABILITY

[75] Inventors: Richard T. Schneider, Gainesville; James F. Long, Freeport, both of Fla.

[73] Assignee: The United States of America as represented by the Secretary of the Air Force, Washington, D.C.

[21] Appl. No.: 475,676

[22] Filed: Mar. 15, 1983

[51] Int. Cl.$^4$ .......................... G02B 27/00; H01J 3/14
[52] U.S. Cl. ..................................... 250/578; 250/216; 350/167; 364/516
[58] Field of Search .............. 250/578, 216, 201, 204, 250/203 R, 203 CT; 356/4, 152; 358/212, 213; 364/514, 516, 517; 382/42, 65; 350/167, 441, 451

[56] References Cited

U.S. PATENT DOCUMENTS

| | | |
|---|---|---|
| 4,114,037 | 9/1978 | Westwood ........................... 350/167 |
| 4,227,212 | 10/1980 | Woolfson et al. ....... 250/203 CT X |
| 4,270,047 | 5/1981 | Mochizuki et al. ............. 250/578 X |
| 4,272,783 | 6/1981 | Warnstam et al. ............. 364/516 X |
| 4,410,804 | 10/1983 | Stauffer ................................. 250/578 |

Primary Examiner—Edward P. Westin
Attorney, Agent, or Firm—Donald J. Singer; Willard R. Matthews

[57] ABSTRACT

Very wide field of view optical surveillance is realized without scanning or moving parts by means of an integrated multiaperture optical system. The system utilizes light gathering optics in the form of an array of eyelets or lens apertures that direct in-coming light onto a detector layer. The detection layer consists of individual detectors, more than one to a lens. Under the detector layer there is a correlation layer, which contains a memory cell for each detector and circuitry which connects to neighboring memory cells according to a hard wired program. Below the correlation layer is a processing layer which contains microprocessor circuitry allowing further processing of the acquired information. Outlines of objects seen by the system are defined by the microprocessor circuitry using an edge detecting routine. A detected object is identified by correlation with a single number recognition coefficient. The microprocessor circuit includes a memory matrix in which is stored recognition coefficient for objects of interest. The lens aperture can be configured to form either apposition or neural superportion images and algorithms for processing information obtained by both modes of operation are developed. The data processing circuitry is implemented by means of large scale integrated circuit technology whereby the memories in the correlation layer are physically located directly below their associated detectors.

8 Claims, 42 Drawing Figures

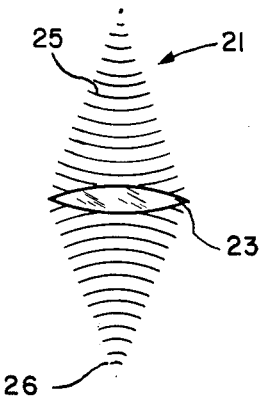
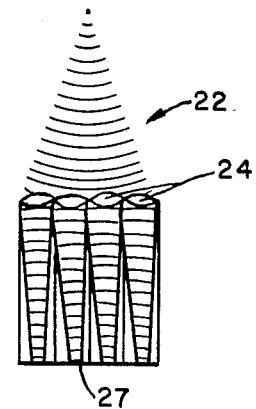
FIG. 1A      FIG. 1B
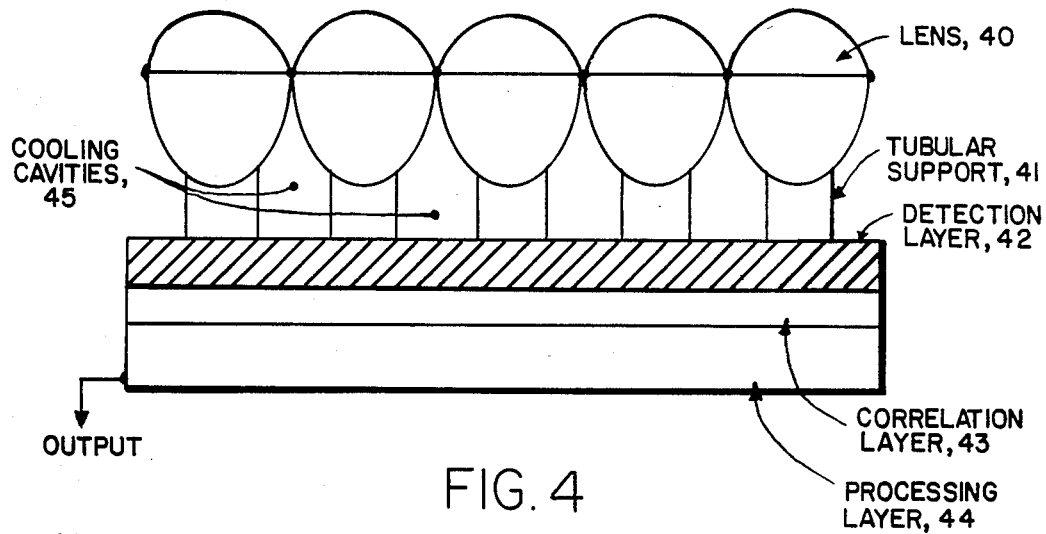
FIG. 4
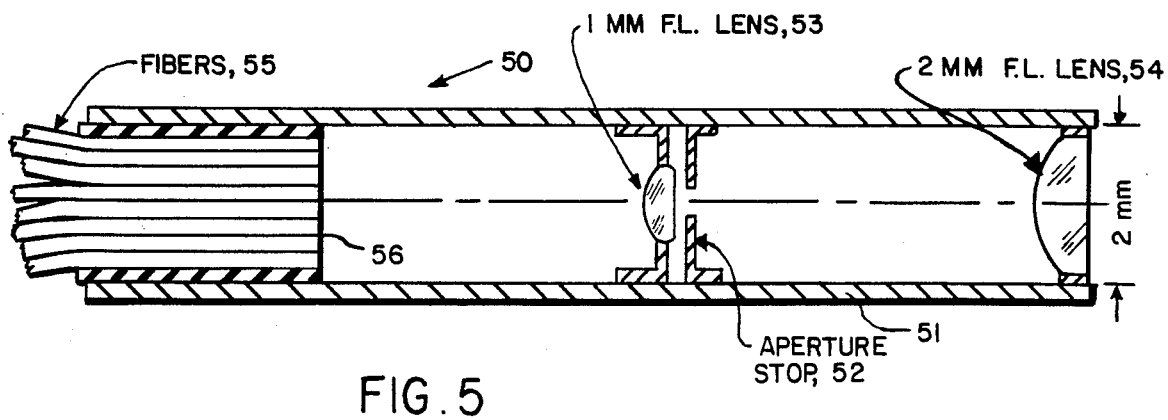
FIG. 5

SINGLE APERTURE EYE

AIRY DISK AND DETECTOR SAME SIZE

SUPERPOSITION EYE AND NEURAL SP EYE

AIRY DISK AND DETECTOR SPACE REQUIREMENTS

APPOSITION EYE

SINGLE APERTURE EYE

APPOSITION EYE

NEURAL SUPERPOSITION EYE

```
     1 0 3 0 0 1
    1 1 3 6 1 0 0
   0 1 3 6 5 2 0 0
  1 0 3 5 6 4 0 2 1
  1 0 1 6 9 7 5 2 1 0
   0 3 6 8 7 7 4 0 1
    0 5 6 4 4 4 5 0
     2 3 6 0 1 1 2
```

```
     0 0 0 0 0 0      T=4
     0 0 0 1 0 0 0
    0 0 0 1 1 0 0 0
    0 0 0 1 1 1 0 0 0
   0 0 0 1 1 1 1 0 0 0
    0 0 1 1 1 1 1 0 0
     0 1 1 1 1 1 1 0
      0 0 0 0 0 0 0
```

```
  0 0 0 0 0 0
  0 0 0 1 0 0 0
 0 1 1 1 1 1 1 0
0 1 1 1 1 1 1 1 0
0 1 1 1 1 1 1 1 0
  0 0 0 1 1 1 0 0 0
    0 0 1 1 1 1 0 0
      0 0 0 0 0 0 0
```
FIG.12A
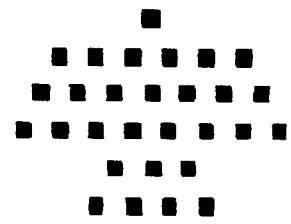
FIG.12B
```
    0 0 1 0 0
    1 1 1 1 1 1
   1 0 0 0 0 0 1
  1 1 1 0 0 1 1 1
    0 0 1 0 1 0 0
      0 1 1 1 1 0
```
FIG.12C
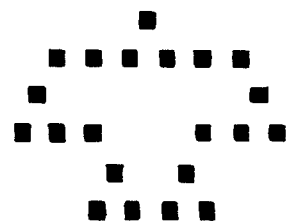
FIG.12D
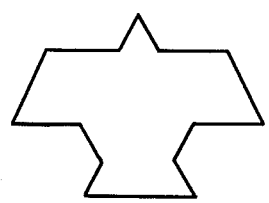
FIG.12E

WITHOUT SHIFT CORRECTION

WITH SHIFT CORRECTION

WITHOUT SHIFT CORRECTION

WITH SHIFT CORRECTION

DIFFERENCE IN SLOPES

FIG. 18

MAPPING OF THE TIME SERIES INPUT
DATA SET INTO PHOTORECEPTOR MATRIX

```
      .0  1.0   .0   .3   .9   .0
   .3   .2   .2   .6   .1   .1   .5
   .4   .1   .2   .5   .2    1   .1
0
   .2   .1   .2   .1    8   .1   .1   .1
5
  .4   .2   .1   .1   .1   .1   .1   .1
  .1   .1
   .1   .0    1   .1   .2   .0   .1    2
  .1
    2   .1   .1    1   .1   .1    6
2
      .2   .1   .3    2   .3   .4    1
```

NEURAL SUPERPOSITION IMAGE

```
       .1   .2   .2   .2    2
    .1   .1   .2   .2    1   .1
    .1   .1   .1   .1   .1   .1    1
  2   .1   .1   .2   .1   .1    1   .1
    .1   .1   .1   .1   .1   .1   .1
    .1   .1   .1   .1   .1   .1
```

DATA FILE NAME; DATAXY
W1=.5  W2=.5  W3=1  W4=.5

THRESHOLD=.155

TYPE B NEURAL SP EYES

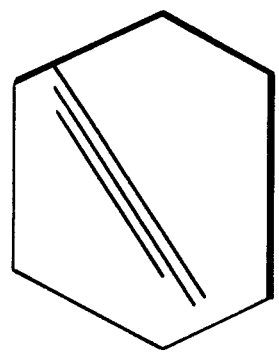
FIG.23B TYPE B NEURAL SP EYES
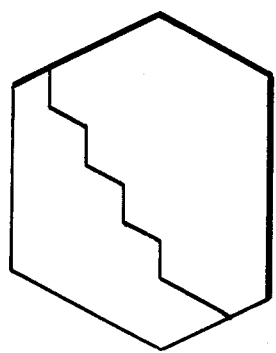
FIG.22B TYPE B NEURAL SP EYES
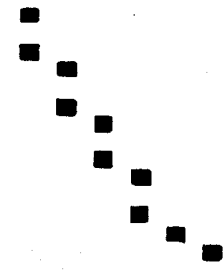
FIG.22A TYPE B NEURAL SP EYES
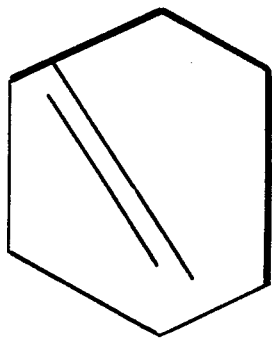
FIG.23A TYPE B NEURAL SP EYES

NON-SCANNING INTEGRATED OPTICAL SYSTEM WITH WIDE FIELD OF VIEW SEARCH CAPABILITY

STATEMENT OF GOVERNMENT INTEREST

The invention described herein may be manufactured and used by or for the Government for governmental purposes without the payment of any royalty thereon.

BACKGROUND OF THE INVENTION

This invention relates to optical systems for acquiring and processing information from a scene and in particular to a non-scanning, integrated multiaperture optical system that views and identifies objects of interest in large scenes the viewing of which requires a large field of view capability.

There currently exists many applications in which very wide field of view optical systems are required. One such application is a U.S. Air Force requirement for a very wide field of view optical seeker for air-to-air, air-to-ground and ground-to-air missiles. Other applications include industrial robots, space based sensors and security surveillance cameras.

It is common practice to meet the requirements of these applications with single aperture optics systems. However, since, in the single aperture optical system the focal length is tied to lens diameter (and field of view) the light gathering optics must either be very large, or else, the lens must be scanned in order to provide wide angle field of view surveillance. The size and complexity of systems based on this approach make it impractical for airborne applications. The size and focal length required for a very wide field of view single aperture lens that would function without scanning would of necessity, be too large to be accomodated on a missile. On the other hand, in order to provide scanning, optical domes, gimbals and Cassegrain optical systems would be required. For other applications the cost and complexity associated with single aperture lens systems frequently render that approach impractical.

The above enumerated disadvantages of single aperture optical systems are eliminated by utilizing multiaperture optic principles wherein lens size is de-coupled from focal length and physical space requirements are reduced. The concept of a multiaperture optical system is based on the biologically evolved invertebrate (insect) eye. The invertebrate multiaperture eye and its development and relationship to a mechanical model implementing it are described in detail in the papers *Signal Processing In The Insert Eye* by J. F. Butler, R. C. Wilkinson, R. T. Schneider and J. F. Lang and *A Mechanical Model Of The Insect Eye* by R. T. Schneider, E. E. Carroll, Jr., G. R, Dalton and J. F. Lang presentd at the IEEE SOUTHEASTCON, 1982, Sandestin, Destin Florida, Apr. 4–7, 1982 and published in the IEEE PROCEEDINGS thereof. Further details are described in the University of Florida Draft Final Report Volume II entitled *Multiaperture Optics* by Richard T. Schneider, dated Dec. 1, 1982, which report is incorporated herein be reference. This report will be published as an Air Force Armament Laboratory Formal Report.

The cited references describe two types of multiaperture optics that are useful for the applications indicated above. They are the apposition eye and the neural superposition eye.

It is well known and has been demonstrated in the above cited references that image formation can be achieved either by interference or collimation. The latter is mostly used for high energy radiation, where the corresponding wavelengths are too short to be practical for interference systems.

The apposition insect eye is a collimation system. A collimator is often lensless, e.g., for neutrons or gamma particles. Even if a lens is used like in an autocollimator, the property of light which is utilized is the fact that it propagates in a straight line. The apposition eye uses lenses not for image formation, but for definition of the field of view for an individual eyelet. The location of the image point is entirely determined by the fact that the light propagates in a straight line. One consequence of this is the decoupling of the focal length of the eye from the field of view of the eye. The field of view is determined by the curvature of the surface of the multiaperture eye. For the single aperture eye this surface is already utilized for determination of the optical properties of the lens rather than for definition of the field of view which is now determined by the focal length. (For a given f-number and a given eye diameter). The consequence is that in the case of the multiaperture system the focal length can be kept extremely short, which provides for a minimum depth for the total eye.

Another difference between interference and collimating optics is the curvature of the image plane (retina). For the apposition eye the curvature of the retina is always convex while it is concave for a single lens eye. If the multiaperture system is to be mounted on a surface (like the skin of a missile) the convex curvature makes this possible.

The disadvantage of the apposition eye is the limited resolving power which, however can be made good by using a very large number of eyelets.

The neural superposition eye is no longer a collimation system but an interference system. It forms a small image. Since an image is formed, the question is why not use one lens only and obtain better resolving power. Obviously the neural superposition eye should be only used for special applications where details of the image are not important. This eye necessarily must be target oriented and not detail oriented. If it is necessary to identify a target as such and to determine where it is located rather than to describe differences in similar targets then the neural superposition eye has advantages over the single aperture eye. The advantages discussed above for the apposition eye still apply to some degree for the neural superposition eye, namely the decoupling of the field of view from the focal length and the convex shape of the retina.

Based on the above discussed fact, it can be seen that multiaperture optics can be used for specialized applications where the location and recognition of the target is more important than detailed description of the target. Such applications would include all optical systems having space and complexity limiting requirements as with the air-to-air missiles, air-to-ground missiles, ground-to-air missiles, robots, space based sensors, security surveillance cameras mentioned above.

SUMMARY OF THE INVENTION

The invention is an integrated multiaperture optical system that provides viewing of and object identification in a very large scene without scanning of the light gathering optics. The system has the advantages of having a very large field of view without scanning; greatly reduced space requirements; large scale integrated circuit construction; reduced complexity and manufacturing costs; and improved performance for certain applications. It is particularly suited to U.S. Air Force optical missile seeker applications.

The integrated multiaperture optical system of the invention comprehends multiaperture light gathering optics that projects received electromagnetic wave energy onto a detection layer. The output of the detector layer is correlated and then processed by a data processing stage to identify objects of interest in a scene being viewed by the light gathering optics.

The multiaperture light gathering optics consists of an array of eyelets, or lens apertures, each viewing a discrete region of the scene under surveillance. The lens aperture members can have optical configurations and orientations that effect either apposition or neural superpostition imaging on the detector layer. The array can consist of either type lens aperture members or a combination of them.

The detector layer comprises a separate detector for each lens aperture member and each detector has a multiplicity of elements with each element having a separate output.

Correlation is achieved in a correlation layer adjacent to the detector layer. It contains a memory for each detector element. There is an amplifier and analog/digital converter combination for each detector element that conditions and loads data received by the detector element into its associated correlation layer memory. Certain memories are interconnected in accordance with a hard wired program to effect neural superposition image processing.

A processing layer adjacent to the correlation layer includes a memory matrix that accesses the correlation layer memories. The data processing layer also includes microprocessor circuitry that processes the data contained in the memory matrix in accordance with an object recognition routine and in accordance with algorithms for apposition and neural superposition modes of operations.

The system is implemented by using very large scale integrated circuit techniques whereby correlation layer memories can be physically located directly below their associated detector elements.

It is a principal object of the invention to provide a new and improved integrated multiaperture optical system for viewing a scene, forming an image thereof and detecting and identifying objects of interest therein.

It is another object of the invention to provide an optical viewing system that has a very wide field of view that does not require scanning or moving parts.

It is another object of the invention to provide a wide field of view, non-scanning, optical viewing system having reduced physical space requirements.

It is another object of the invention to provide a wide field of view non-scanning optical viewing system that can be produced using microcircuit technology with reduced manufacturing costs.

It is another object of the invention to provide an integrated multiaperture optical system adapted to use with industrial robots.

It is another object of the invention to provide an integrated multiaperture system adapted to use with U.S. Air Force optical missile seeker systems.

These together with other objects, features and advantages of the inventions will become more readily apparent from the following detailed description when taken in conjunction with the illustrative embodiments shown in the accompanying drawings.

DESCRIPTION OF THE DRAWINGS

FIGS. 1a and 1b are respectively schematic illustrations of converging waves in single and multiaperture optics;

FIG. 4 is a schematic illustration of one presently preferred embodiment of the invention;

FIG. 5 is a sectional view of an individual eyelet, or lens aperture member;

FIGS. 12a, 12b, 12c, 12d and 12e illustrate edge detection of an object in accordance with principles of the invention;

FIG. 18 illustrates a neural superposition mask for use with the array of FIG. 17;

FIGS. 22a and 22b illustrate the result of an edge detection routine;

FIGS. 23a and 23b illustrate the correct interpretations of the representations of FIG. 22.

DETAILED DESCRIPTION OF THE PREFERRED EMBODIMENT

Figure 2A:
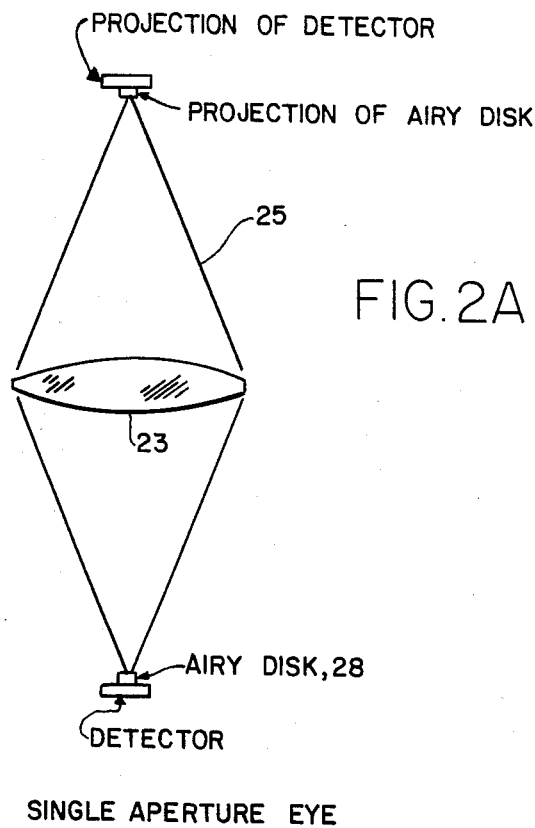
FIGS. 2a, 2b and 2c are respectively schematic illustrations of the single aperture eye, the superposition and neural superposition eye and the apposition eye.

The present invention overcomes the limitations and disadvantages of single aperture optical systems by utilizing a system having multiaperture light gathering optics.

There are certain basic differences between single aperture optics and multiaperture optics. One main difference is based on phase relationships.

These issues are illustrated in FIG. 1. It is assumed that in FIG. 1a that the multiaperture system 22 has the same total aperture (the sum of all individual apertures) as the single lens system 21. Therefore, the same photon flux 25 is intercepted by both systems. The total energy delivered to the detectors 26, 27 is the same in both cases. The individual small lenses 24 have the same focal length as the one large lens 23. Therefore, the image plane is in both cases the same distance away from the lenses.

Since the size of an image produced by a lens depends on the focal length but not on the diameter of the lens, each small lens will produce an image identical to the one produced by the large lens, albeit at much reduced intensity. If the object is infinitely (compared to the focal length) away, parts of the images produced by the small lenses will overlap. The individual intensities will add up and the end product should be identical as far as intensity and size is concerned. However, the quality of the two images is not the same. The reason is that the resolving power is determined by the lens diameter since the image is made possible by the diffraction of the light wave at the physical boundary (aperture) of the lens. The many different light waves going through the small lenses are not in phase with each other. Any interference occurring between them is random and does not, therefore, contribute to the image definition.

Figure 2B:
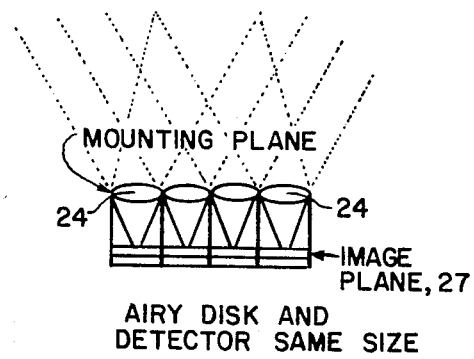
Figure 2C:
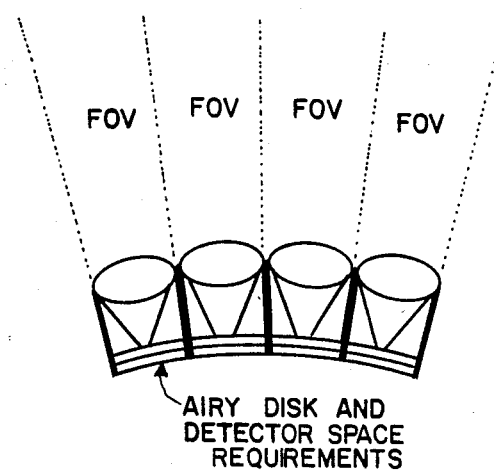

FIG. 2 shows the case where again the total apertures are the same and the f-numbers of each small lens 24 is the same as the f-number of the large lens 23. The images obtained by the small lenses 24 are now much smaller than the image produced by the large lens 23. The image plane is also closer to the lenses, which makes the optical system more compact.

If the design is optimized properly as indicated in the figure, it can be arranged that (1) the field of view of the individual lenses do not overlap, (2) the size of the Airy disk is equal to the space available for it (detector size), which means the Airy disks produced by the many lenses ar not allowed to overlap.

If this is adhered to, an apposition image is obtained. Its size depends on the now introduced curvature (see FIG. 2) of the mounting plane of the lenses, which in turn depends on the condition 2 (no FOV overlap). The size of the Airy disk depends on the diameter of the lenses, which can be chosen freely since only the f-number is given. (The image plane-mounting plane distance can be chosen accordingly to satisfy the f-number requirement.)

In FIG. 1 in both cases the resolution depended on the size of the Airy disks produced by the lenses. And, indeed, the size of the Airy disk of the large lens is much smaller than the ones generated by the small lenses. Therefore, the resolution of the single aperture system should be much better than the multiaperture system of the same total aperture. However, it is a well-known fact that in most cases in the history of optics the Airy disk is always considerably smaller than the detector size available. (E.g., the grain size of the photographic plate.) It means most systems are not diffraction limited. E.g., the f-stop in photography is mostly used for intensity control or depth of focus control. Resolution is rarely an issue determining the f-stop. Natural systems (human eye, insect eye) are usually optimized so that the detector is about equal the size of the Airy disk.

Considering the constraint given by the detector size, it is possible to design a multiaperture system having close to the same (overall) resolution as a comparable single aperture system. The advantage of such a system is that it can be built as large as desired in total aperture, and still have the same thickness, since total aperture and focal length are not coupled through f-number as is the case in a single aperture system.

Differences between the two systems which are germane to image processing are another consequence of phase relationships.

Figure 3A:
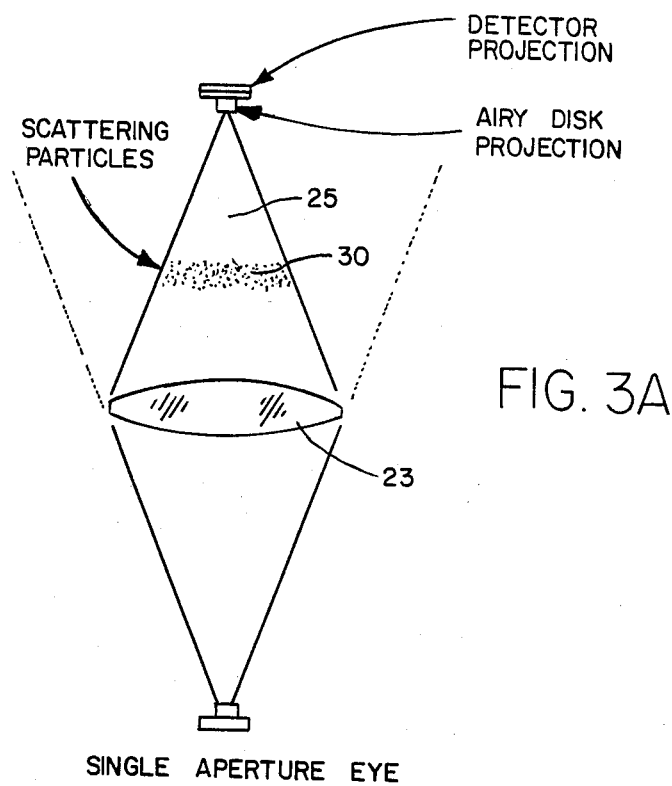
FIGS. 3a, 3b and 3c are respectively schematic illustrations of the suppression of scattered light in the single aperture eye, the neural superposition eye and the apposition eye.

FIG. 3 illustrates this. The incoming wave 25 in FIG. 3a originates at an object point and converges into an Airy disk 28 probably smaller in size than the detector element 26. Diffuse light (noise) 30 may originate in the same regions in space as the object wave came from or it may have been scattered from anywhere into the ray path, so that it will be converged by the lens onto the same detector element as if it were originating from the object point. Noise and signal are usually distinguished by chopping the light beam. The intensity of the signal will then build up in time $\sim$-n, where n is the number of observed chops, while the noise will build up $\sim$-$\sqrt{n}$. If integrated for a sufficient amount of time, the signal-to-noise ratio will be improved to a sufficient extent that the signal can be identified.

Figure 3C:
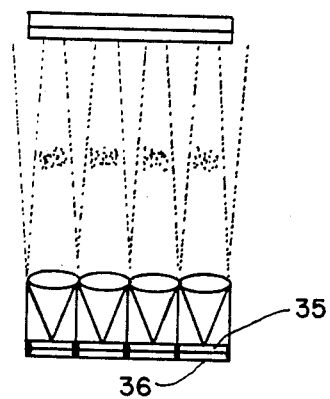
Figure 3B:
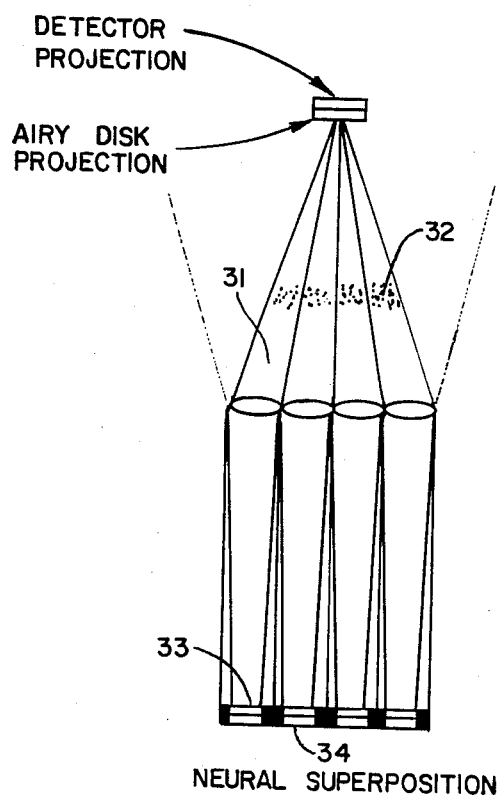

FIG. 3b shows the same situation for the superposition image. The cone 31 which intercepts the scattered radiation 32 is smaller, but so is the cone which intercepts the signal. Therefore signal-to-noise is not changed. However, the size of the Airy disk 33 is now the same as the detector 34. Therefore, while the signal-to-noise is, in this case, no better and no worse than for the single aperture system, the overall resolution also should be the same. However, such a multiaperture system would require precise alignment of all the individual lenses to form a correct superposition image. Therefore, such a system is not very practical.

Next, FIG. 3c shows the situation in case of the apposition image. The projections of the Airy disk 35 and detector 36 (which are the same size) now fill the FOV entirely. The signal-to-noise ratio is still the same as in FIG. 3b. However, if 10 lenses were selected to have identical FOV's, the signal-to-noise ratio would be improved by a factor of $\sqrt{10}$, while an increase of the area of a single lens would not result in an improvement of signal to noise (assuming the scattering particles are homogeneously distributed). The differences are that in the multiaperture system, the 10 light waves coming from the scatered particles are not in phase, but are random while in the single aperture system it is only one lightwave which is now collected through a 10 times larger aperture area exactly as the signal wave is.

In the apposition system, focal length and image size are decoupled, the curvature of the mounting plane determines the image size. This is not true for the single lens system. Therefore, here an increase in the area of a factor $\alpha$ an increase of a factor of $\sqrt{\alpha}$ is required for the focal length, if the f-number is to be kept constant. There is, of course, a practical limit for both focal length and f-number.

One presently preferred embodiment of the invention is illustrated schematically by FIG. 4. It comprises the multiaperture optic array formed of lenses 40, tubular supports 41, detection layer 42, correlation layer 45 and processing layer 44. Each individual lens 40 forms an image on the detection layer 41. The detection layer contains individual detectors, typically 100 per lens.

Figure 6:
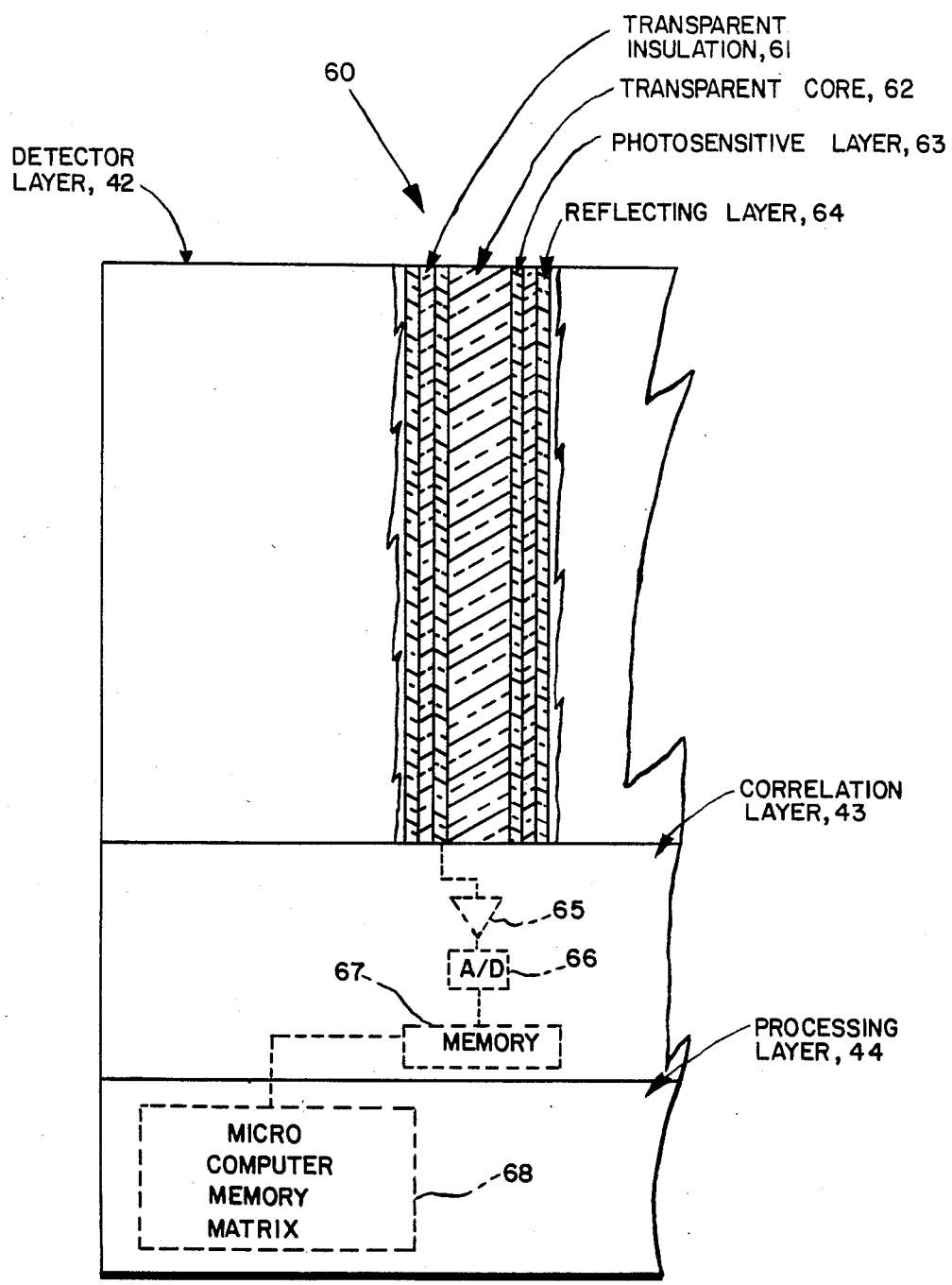
FIG. 6 is an illustration, partly in section, partly in phantom of the detector, correlation and processing layers of the embodiment of FIG. 4.

The correlation layer 43 is a large scale integration (LSI) structure which contains one amplifier per detector and one memory element per detector. The output from each detector is amplified and converted in a number which is stored in the respective memory element. Amplifier, A-D converter, and memory element are physically located underneath each detector in the correlation layer as shown in FIG. 6. Certain detectors will view the same location in space ("equivalent" detectors). Therefore, the content of the memory elements of "equivalent" detectors need to be added and therefore are connected with a wire (hard wired instruction) in the correlation layer. The results of all these additions are stored in a memory matrix (a regular computer core) which is physically located in the processing layer. The contents of this memory matrix can be accessed and rearranged using state-of-the-art circuitry, like any microprocessor would do. Therefore, the processing layer contains similar circuitry, as state-of-the-art microprocessors. This circuitry can perform image evaluation on the contents of the memory matrix.

FIG. 5 shows a typical eyelet, or lens aperture member 50. It comprises a cylindrical member 51, an aperture stop 52, lenses 53, 54, and output optical fibers 55. The end surface of fibers 55 are polished and receive electromagnetic wave energy that is transmitted by the fibers to associated detectors.

FIG. 6 shows details of the detector layer 42 (partially in section), the correlation layer 43 (partially in phantom) and the processing layer 44 (also partially in phantom.) Detector layer 42 comprises a multiplicity of detector elements 40, each of which is cylindrical in shape and consists of a reflecting layer 64, a transparent insulation layer 61, a transparent core 62 and a photosensitive layer 63. Typical diameter of one fiber detector is 100 micrometers. A great many of these fiber detectors are glued together to form the detector layer. The output from photosensitive layer 63 feeds amplifier 65 in correlation layer 43. The output of amplifier 65 is analog to digital converted by analog/digital converter 66 and read into memory 67. All memories in the correlation layer are accessed by the programming layer memory matrix 68. Amplifier 65, analog/digital converter 66 and memory 67 are fabricated in accordance with very large scale integrated circuit techniques and are physically positioned beneath detector element 60.

Figure 7:
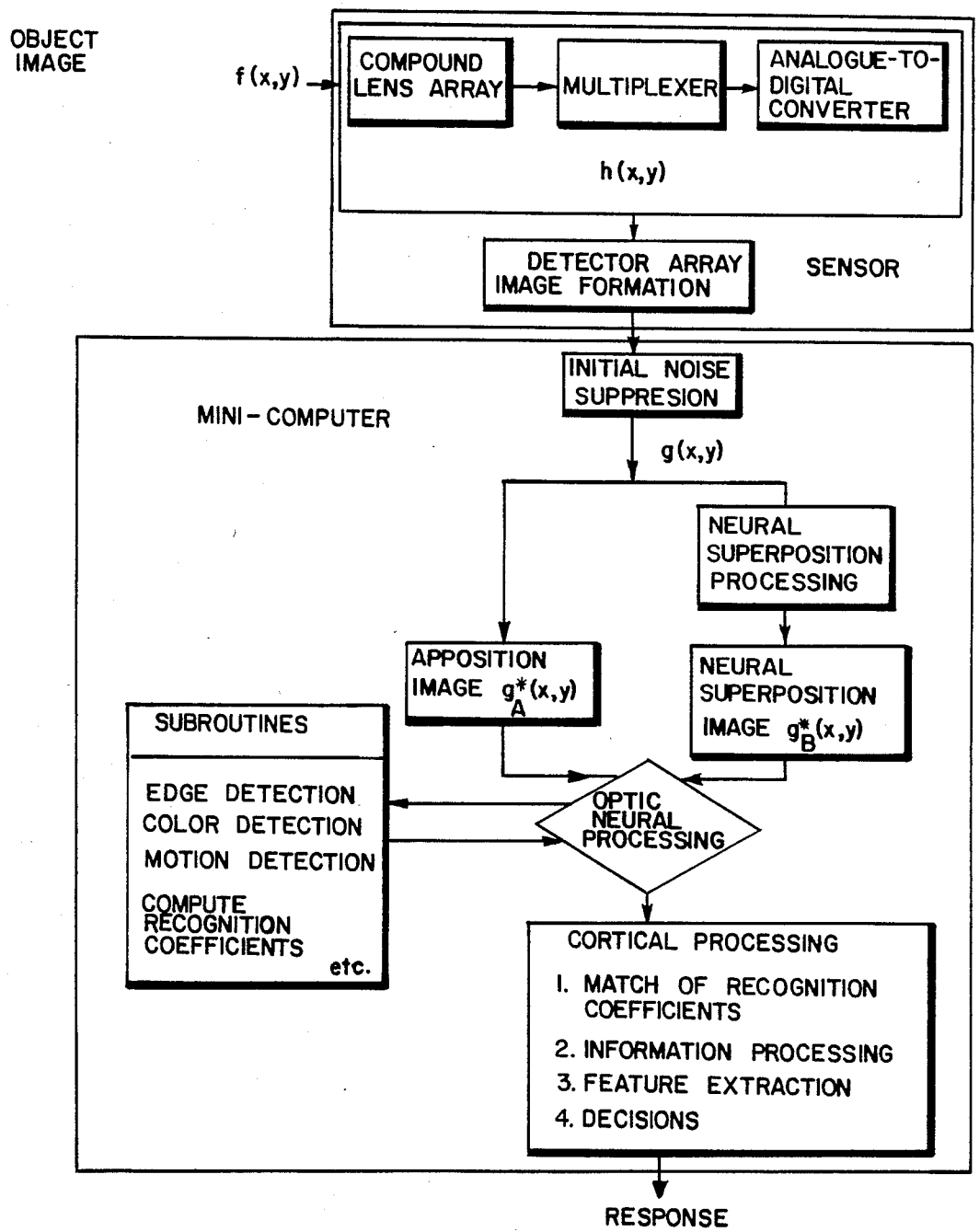
FIG. 7 is a simplified function block diagram of the perceptual process of the multiaperture optic system comprehended by the invention.
Figure 8:
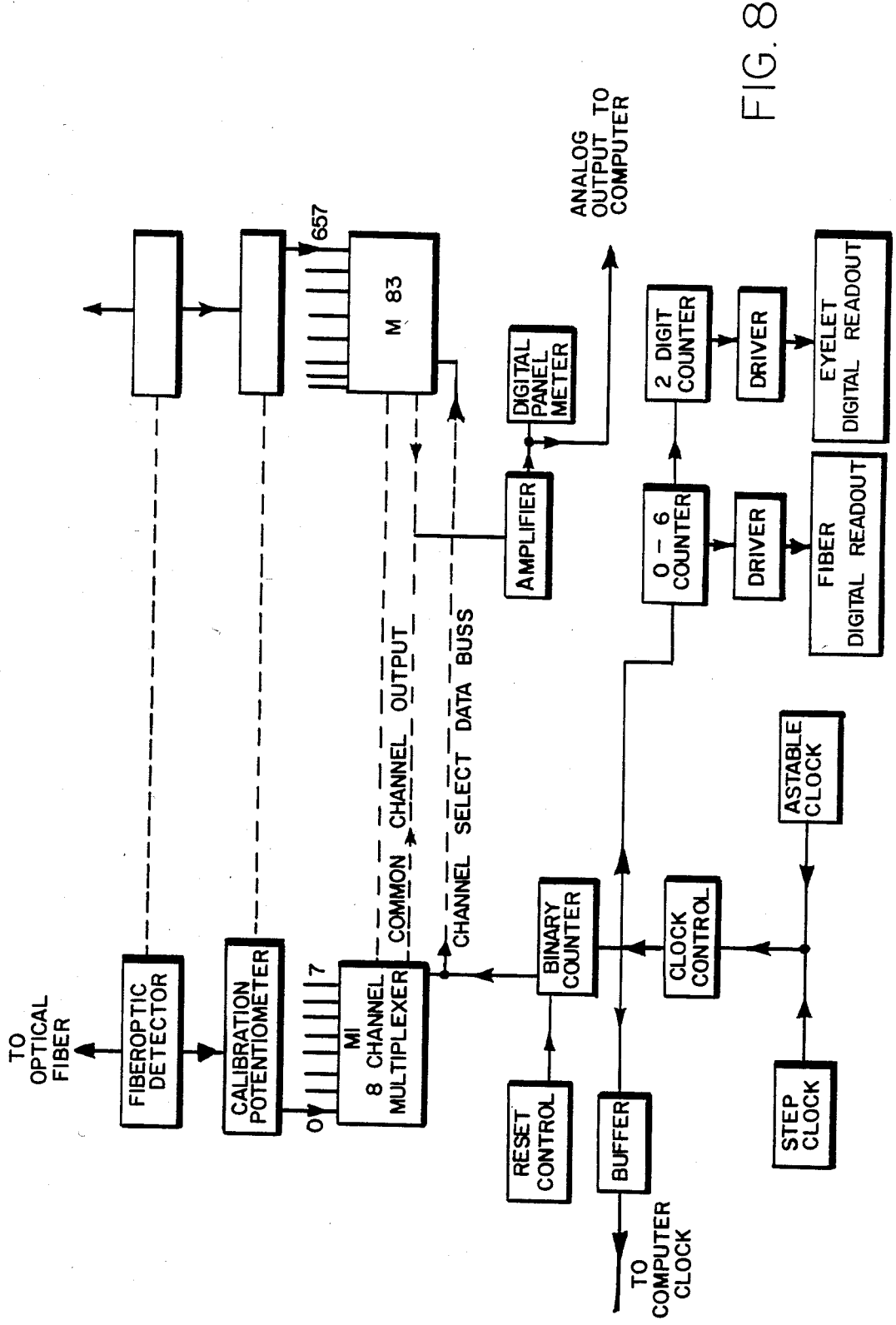
FIG. 8 is a block diagram of the fiber optic multiplexer of FIG. 7.

FIG. 7 illustrates a simplified functional block diagram of the perceptual process of the invention and FIG. 8 is a block diagram of the multiplexer shown in FIG. 8.

Each object necessarily has to have a boundary. In an image, this boundary is recognized as an edge. The combination of the edges form an outline of an object. For humans an object is recognizable just by such a outline drawing although it does not contain all the information necessary to describe the object completely. A complete description of the object would be obtained by a picture of the object (e.g., a color photograph). It is obvious that for some applications an outline drawing is sufficient and for other application, a picture is required.

The fact that a multiaperture eye chops the observable space into individual elements (quanta) suggests already that such a device is better equipped to provide an outline drawing rather than a picture. It suggests also that digitizing of the observed information occurs naturally very early in the large recognition process.

In natural systems, the fact that a nerve can only fire at a given potential, independent of the intensity of the stimulus, dictates that this intensity is represented by the number or frequency of pulses rather than the height of these pulses. This can be viewed as a form of digitizing which has to occur right at the detector levels where light is converted into an electrical signal. For non-natural systems, it proves also more advantageous to convert the signal into numbers, as soon as a requirement exists to process the signal in a way that goes beyond more amplification. If weighing, cross correlation, or adding of signals is required, it is easier to do this digital than analog.

Digitizing of an image produced by a large single lens can, in principle, be accomplished in two different ways, namely by temporal acquisition and spatial acquisition. Temporal acquisition involves reading and digitizing one pixel at a time and feeding this information through one line into a memory where it can be stored as a linear array or a matrix, depending on the architecture of the memory.

Spatial acquisition would involve reading and digitizing all the pixels simultaneously and feeding them into the memory with a number (n) of lines, where n is equal to the number of pixels.

Examples for temporal acquisition is a television camera, while a focal plane array would be an example for spatial acquisition if it could be read simultaneously; and even if this could be done most computers lack the number of input ports to handle such a flow of information.

Of course images created by multiaperture systems could be handled either way. However, since the digitizing—at least in natural systems—happens right at the detector, it is only reasonable to expect that the individual memory cell would receive information directly from the detector (spatial acquisition) and is also located right at the detector level of this eyelet. Any computation (cross correlation, etc.) would require nerves which interconnect the individual eyelets at the eye level). And, indeed, there are three layers of nerve nets at the basal membrane of the insect eye which could serve this purpose. Obviously, this situation can be imitated by integrated circuits and achieve so true spatial (instantaneous) processing.

FIG. 4 (the embodiment of the invention described above) shows how such a detection system may be realized by large scale integration. The lenses 40 supported by small tubes 41 form an image (or Airy disk) on the detectors on the surface of the detection layer 42. A memory cell is located directly under each detector. The memory cells are interconnected with each other in the correlation layer to form a complete memory. The memory can be read by the processing layer which may comprise a ROM with programmed steps how to evaluate the information. The output of the processing layer relays the results of these calculations, to the maincomputer of the vehicle. These results may contain the identification of the target, its position, speed, and any other desired information.

In each case of image acquisition, temporal or spatial, the image is represented by a set of numbers forming a two or more (e.g., gray scale) dimensional matrix. In the case of multiaperture optics, the number of elements of this matrix reflects the number of eyelets (there may be more than one element per eyelet), but this number is necessarily limited by practical considerations. In the case of single aperture optics, the number of elements can be as large as desired. The upper limit is just the collection time one is willing to allow and the size of the memory.

Therefore, it can be expected that single aperture systems are detail oriented while multiaperture systems are outline (pattern) oriented. If this is to be the case there must be pattern recognition schemes which work better with multiaperture optics. It will be shown hereinafter that edge detection indeed becomes easier with multiaperture optics, however, the most striking advantage lays in the pattern recognition process itself. It is proposed that pattern recognition in insect eyes is done, and should be done in non-natural systems, by cross correlation. A very simple way of correlation is proposed and explained in the following example.

Figures 9A, 9B, 9C:
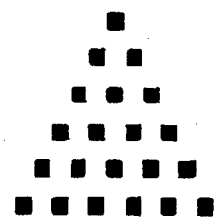
FIGS. 9a, 9b and 9c illustrate image conditioning for pattern recognition in accordance with the principles of the invention.

FIG. 9(a) shows a matrix describing an image. This matrix may be the result of the readout of the eyelets of an apposition eye. Each number may reflect the intensity seen by one individual eyelet. The matrix contains noise as well as image information. Therefore, a threshold of T=4 is defined and applied to the matrix. A value (n) will be set to '0' if n 4 and to '1' if n 4. The resulting matrix consisting of only zeros and ones is also shown in FIG. 9(a). The image obtained if the ones are represented by points and the zeros are ignored is shown next to the matrix in FIG. 9(a). If displayed on the screen a human observer will recognize the image as a triangle. For a machine a procedure has to be developed so that it will also recognize this figure as a triangle.

In accordance with the invention this is done by computing a 'recognition coefficient' (N) which is one number and will adequately and uniquely describe the shape of the object.

In order to accomplish this the recognition coefficient (N) is computed as follows:

$$N = \sum_{\substack{i=1 \\ j=1}}^{L,K} \frac{I(i,j)}{W(i,j)}$$

where j is the column number, i is the row number, L the number of rows, and K the total number of columns. I(i,j) is either 0 or 1. The weighing factor W(i,j) for the ij$^{th}$ element is computed as follows:

$$W(i,j) = j + (i-1) \times K$$

Figure 10:
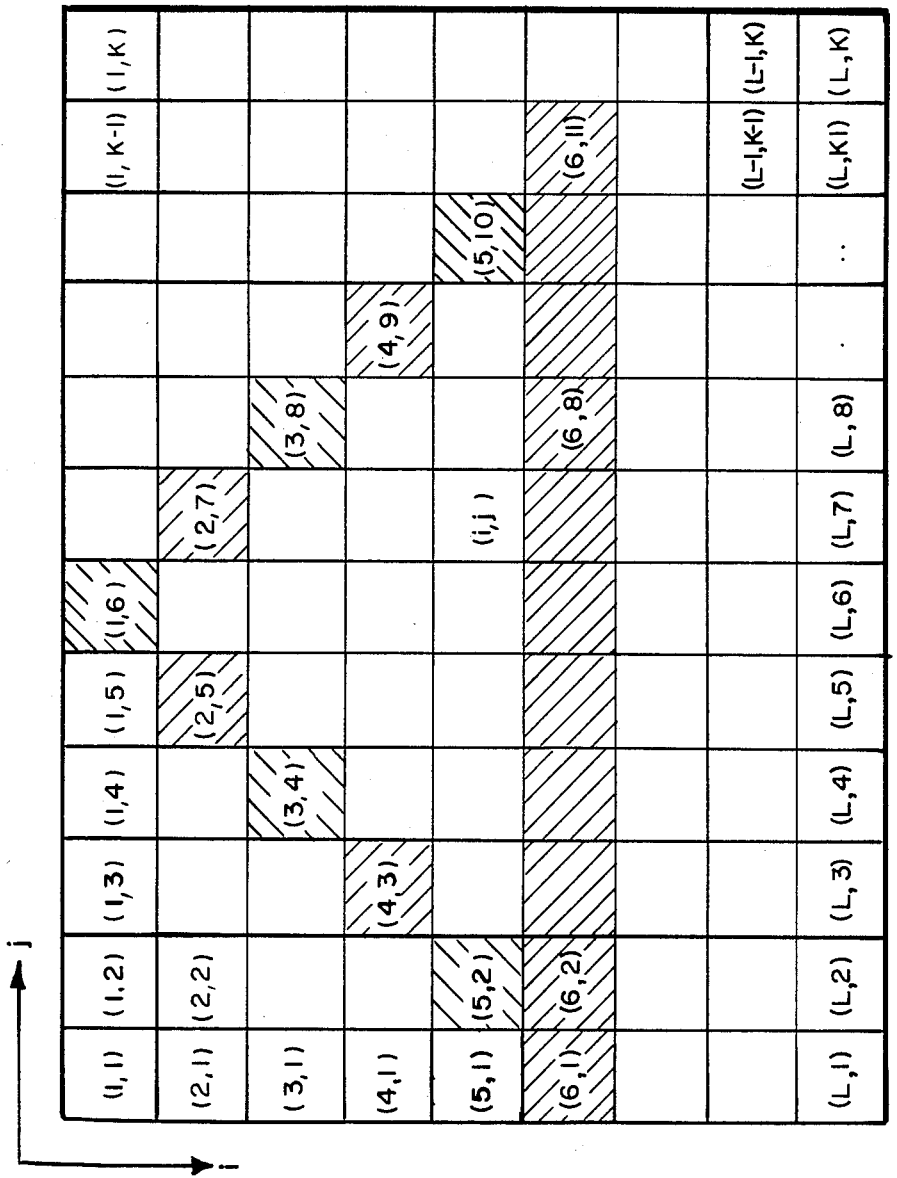
FIG. 10 illustrates means for recognition coefficient determination.

Before the weighing factor is applied the weighing factor mask is aligned on the matrix that column number '1' covers the most left sided '1' of the matrix and row number '1' covers the highest '1' of the matrix. This is illustrated in FIG. 10, which shows the weighing mask and the position of the triangle. Each element of the matrix is divided by its corresponding member of the weighing mask and the results are added. Since the eye is hexagonal and the weighing mask is a regular matrix, only every second member of the weighing mask is actually used.

The result of the computation is one number, the recognition coefficient, which is unique for the shape of the object. The result in the example shown is:

N=1/6
+1/20+1/22+1/34+1/38+1/48+1/54+1/62-
+/1/70+1/76+1/77+1/78+1/79+1/80+1/81-
+1/82+1/83+1/84+1/85+1/86=0.523625381-
589

The recognition coefficient for common shapes need to be determined once for each eye after it is produced. If they are permanently entered in a ROM the eye will be able to detect and recognize objects of a given shape.

Therefore it can seen that an object is recognized by a fairly simple calculation. The object is recognized only by its shape, which is represented by only one number.

There are three differene types of eyes postulated for insects. For non-natural systems only two of those are of interest.

The three types are:
Apposition Eye
Superposition Eye
Neural Superposition Eye

FIG. 2 shows these three types of eyes in addition to the regular single aperture eye.

1. Apposition Eye

In case of the apposition eye, the field of view of the individual eyelets are adjacent and not, or only insignificantly, overlapping. An object which is too small to fill the entire field of view of the individual eyelet is preceived as one point filling the whole field of view being located in the center of the field of view. Therefore, in order for two points to be resolved, they have to be far enough apart so that they fall into the field of views of two different eyelets. The resolving power of such an eye is, therefore, inversely proportional to the diameter of individual lens, assuming that the detector is located at the focal point of the lens. Such a lens then acts as a collimator, defining a parallel bundle, having the same diameter as the lens, as field of view.

There may be more than one detector in the apposition eye, although obviously only one is necessary for determination if there is an object point or not. The other detectors may be used for the same purpose, either duplicating the first one, or more likely detecting the same object point at a different wavelength.

The fact that the apposition eye moves the image point into the center of the field of view falsifies the true position of the target. Certainly for some applications it would be desirable to acquire the true position, for other applications it may be desirable to maintain this falsification, since it will straighten out a wiggly line. Since there is a practical and a theoretical limit as to how small the individual field of view can be made, it is desirable to design (or to evolve) a system, where an improvement in target position can be made at reasonable lens sizes. Since the detector is located at the focal point of the lens, it perceives not an image but an Airy disk created by the lens. According to the design concept of the apposition eye, the size of the Airy disk is on the order of the diameter of the one (although fused) rhabdom. If the Airy disk were much smaller, the eyelet could resolve two different points within its field of view, but the detector would add them electronically back together. To avoid this, an apposition eye having separated rhabdomeres would be the next step in evolution. It is reasonable to assume that the rhabdomeres would separate first without the lens being enlarged and at a later step the lenses would get larger and the detector plane would move out of the focal point into an image plane, thus evolving into the superposition eye. Therefore, as an intermediate eye, creating an Airy disk in the order of the diameter of the cluster of rhabdomeres, but the rhabdomeres are now separated.

If the one point (e.g., the edge of an object) filling the field of view, should now not be located in the center of the field of view, the Airy disk will be displaced to one side. The seven individual rhabdomeres will be unevenly illuminated. A center of gravity of illumination can, therefore, be calculated, which will reveal the true position of the object within the field of view.

2. Superposition Eye

In the case of the superposition eye, the detector plane is moved towards a position between $1f$ and $2f$ (f: focal length of the lens). The effect is that now a real image is formed. The size of this image can be considerably larger than the diameter of the lens. If the walls of the eyelets are transparent (clear zone) the image spreads over the detector of the neighboring lens. The same happens with the images created by the neighboring eyelets. Therefore, many images overlay (are superpositioned). Of course the individual images must be carefully aligned to make an object recognizable.

In such an eye the resolving power is now proportional to the diameter of the lens, like in a single aperture eye. This eye requires a second lens, since the image has to be upright and not reversed as a single lens would produce. Therefore, such an eye would constitute quite a large step in evolution, if it indeed exists in nature. It would be close to a single aperture eye, however, still afflicted with the drawbacks of the multiaperture eye, namely small lens diameter (which now matters for resolving power), and convex curvature of the retina. For this reason it is of minimal interest for non-natural systems, since here the parameters cannot be fairly chosen and there is no need to go through intermediate steps.

3. Neural Superposition

In the case of neural superposition, the detector plane is located close to the focal point of the lens, but not at the focal point. The consequence is that a small, although poorly resolved, image is obtained within the eyelet. The walls of the eyelet may be opaque, therefore no optical superposition takes place. The field of view of the neural superposition eye is smaller than the one of the superposition eye, but larger than the one of the apposition eye.

Figure 11:
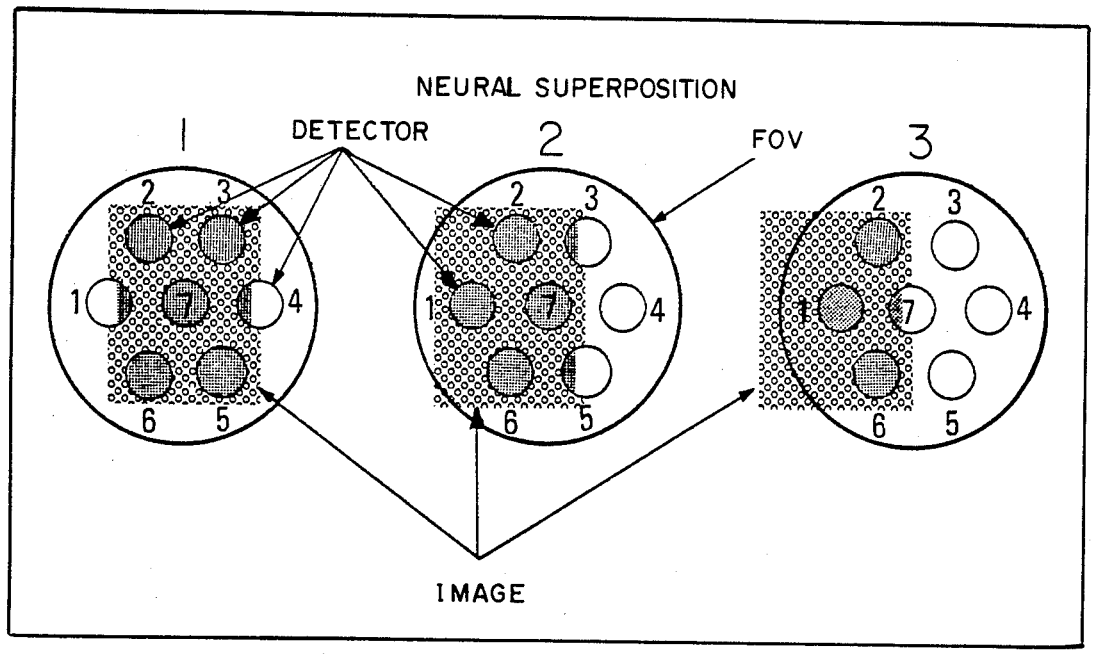
FIG. 11 illustrates an image shown on several detectors in the neural superposition embodiment of the invention.

FIG. 11 shows the situation for the neural superposition eye. In contrast to the apposition eye, the field of view of the individual eyelets overlaps. The overlap is only partial, which means the optical axes are offset against each other. The offset ($\beta$) being:

$$\beta = X/n$$

where x is the field of view of an individual eyelet and n is the number of detectors in one linear row. The shaded area in FIG. 11 is the image of a rectangular object. If one were to describe the right edge of this rectangle using eyelet #1, only the detector #4 (1.4) would give information on the location of the edge. However, the design of the eye is known and, therefore it is known that in eyelet #2 the detector 2.3 and 2.5 must also see the edge as well as detector 3.7 in eyelet #3. Therefore, in general, an object edge (line) is described by 1.5 detectors (n=number of eyelets). However, each individual image is poorly defined. The resolving power of the total eye depends, in contrast to the apposition eye, now linearly on the diameter of the lens of an individual eyelet. This seems a step backward. However, it should be noted that in the apposition eye the requirement was that the Airy disk has a diameter equal to the detector cluster diameter (the distance from detectors 1 to 4). Now, in the neural superposition eye, the requirement is that the diameter of the Airy disk is equal the diameter of one detector, which means about a factor of five smaller. Therefore, the diameter of the individual lenses has to be a factor of five larger. If the smallest size of the detector is given by practical limitations, this new diameter is the optimum diameter for resolution, even for a single aperture eye. Any larger lens diameter would not increase the resolving power of the eye. In case of a single aperture eye, the image would need to be spread out over a larger number of detectors and, therefore, the focal length needs to be increased, which in turn, would require a larger diameter of the lens in order to keep the f-number the same.

However, if there is only a small number of detectors per eyelet available (e.g., 7) there is no need for a lens of diameter larger than required to produce an Airy disk equal to the diameter of an individual detector. As pointed out already this will result in a poorly resolved (due to the small number of detectors) image, which however will be detected if it is there even under poor signal to noise conditions due to the large redundancy of the neural superposition eye. In contrast to this a very noisy image acquired in great detail with a single large lens may not be recognizable since the randomness of the noise will compete with the randomness (in the spatial domain) of the image content.

From this discussion it can be seen that if there is a requirement for a short focal length and a convex image plane. with a minimum detector size as side condition, only the apposition and neural superposition eyes can solve the problems. Short focal length and convex image plane mean small depth of the overall eye, which was an overriding requirement for the evolution of the insect eye. If it is necessary to cover a substantial part of the surface of a missile with an optical sensor, the same requirement would logically prevail.

By comparing the apposition eye and the neural superposition eye the conclusion applied is that the neural superposition eye more redundant than the apposition eye. The loss of one eye means more loss of information in case of the apposition eye. On the other hand, the apposition eye has a better resolving power. How much better depends on the degree of redundancy the neural superposition eye has, which means how often is the same point of an object sampled by a different detector. Obviously, there is an optimum, depending on the application.

The image of either the apposition eye or the superposition eye is represented as a matrix of numbers. As pointed out above, the recognition of an object can then simply be done by cross correlation with stored information describing an identical or very similar object. This method is indeed unambiguous. However, if complicated shapes are involved the deviation from the correlation coefficient which can be tolerated becomes smaller and smaller the more complicated the shape of the object turns out to be.

For this reason, it should be desirable, at least for some applications, to simplify a complicated shape into a number of simpler shapes. This is usually done by breaking a picture down into an outline drawing. Naturally, some details will be lost this way, but ironically, object recognition improves, nevertheless. Basically, the reason for this is that there are no two objects in this world which look exactly alike. Only after some detail is removed can two objects therefore look alike.

Therefore, once the image is available in a matrix, it is necessary to define certain ranges of numbers that are to be considered equal. E.g., set any number in the matrix between 0 and 9 equal to one and any number between 10 and 100 equal 2 and so on. The effect is that now larger fields of equal numbers the computation is 0 the value '0' will be inserted in an image matrix at the same location where the center of the mask was located. If a value larger than zero is obtained, when applying the mask, the value '1' is inserted into the image matrix, which, after completion, will contain only zeros and ones, the ones will outline the object.

Figure 13:
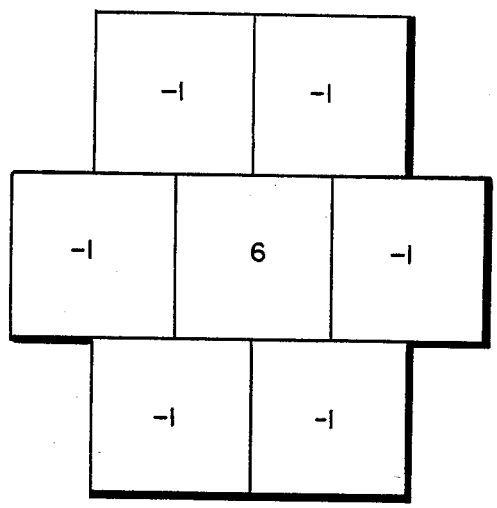
FIG. 13 is a mask for the edge detection process.

FIG. 12 shows a simple example. In the first part of the FIGS. ((a) and (b)) the image matrix is shown after all values were set to either one or zero. If the ones are represented by dots and the zeros are ignored, the attached image is obtained. Then the edge detection process using the mask shown in FIG. 13 is applied. The resulting image matrix and the representation of ones by points is shown next in FIG. 12 ((c) and (d)). A subroutine which connects all points by a straight line is then applied and the final image is obtained as shown in FIG. 12 (e).

It must be realized however, that this edge detection, which makes an outline drawing possible is only done for the sake of the human observer who needs to see an image on the video monitor. If the multiaperture eye is to be used to recognize an object and designate it as a target, only the computation of the recognition coefficients is necessary.

As pointed out before the multiaperture eye is target oriented not scene oriented. This means the eye is specialized to sort out a target and recognize it rather than collect all available information in great detail and reconstruct the total scene as an image of reality. Therefore, for the multiaperture eye two major sources of noise exist. This is actual noise and another type of noise designated 'information noise.' This 'information noise' is all the unwanted information (detail) which is collected but is not germane to the target. Optical preprocessing as discussed above is one way to reduce this 'information noise.' The part of the surplus information which is strongly correlated (e.g., an edge) will contribute to the image. It will be recognized as such and is therefore not to be considered as 'information noise.' It will be ignored because it is not germane to the target. However, details smaller than the resolving power of the eye, which however may have large intensities, appear as singularities which are not correlated with anything. In case of the apposition eye, the effect will be that one eyelet of a set of eyelets which see an object will report an unusual high intensity while the rest of the set will report about the same intensity. Therefore, in the case of instantaneous observation, it cannot be determined if the observed singularity is a signal or if it is noise. In the case of the neural superposition eye which is highly redundant (see above), the singularity will be confirmed as signal by all the detectors viewing this particular spot.

An initial attempt to remove noise may be to define a threshold. Any number in the image matrix smaller than the threshold number will be set to zero. Of course this removes not only noise but signal as well. If the signal to noise ratio 1, then thresholding is of course not acceptable. Therefore, other noise suppression methods have to be used.

As pointed out before, the neural superposition eye has considerable less resolving power than the apposition eye. Therefore, to justify its use, the target would have to be so noisy that a higher resolving power would be useless. The high redundancy of the neural superposition eye will have to be used for noise supression.

It must be realized that in certain applications it may be necessary to detect the target in a very short time, almost instantaneously, e.g., if the target appears from behind an edge, etc. This may be critical for the survival of the insect. It may also be critical for an air-to-air missile in partly occluded skies. The fact as to whether a singularity is a signal or is shot noise can be determined in the case of the neural superposition eye by a coincidence test. If the probability that any detector in the total eye will experience the dectection of a noise shot is $P_s$, and if the number of detectors viewing the same point in space is n, then the probability $P_o$ that the observed singularity is shot noise is:

$$P_o = P_s^n; \quad P_s < 1$$

Therefore, it takes only a few detectors to be sure that the observed spike is indeed a signal.

If the noise is not generated in the detector but in the space between the target and eye, noise suppression can also be accomplished by the multiaperture eye. FIG. 3 shows such a situation. Assume that one of the small particles will scatter a light beam coming from the side into the field of view of an individual detector. The detector will detect this as a contribution to the energy coming from the target point.

In the case of a single aperture eye the S/N is not changed if the lens diameter is enlarged, since the eye will detect more signal, but also more scattered light. The light cone depicted in FIG. 3(b) represents the light cone accepted by one of the seven detectors in one eyelet of the neural superposition eye. If one particle only were to scatter the beam coming from the side, only one detector is affected. Of course all particles scatter but the waves are not coherent and it is not reasonable that all of their Pointing Vectors will be parallel. An increase in the aperture which means in this case an increase in the number of eyelets indeed increases the S/N ratio. The neural superposition eye sort of 'looks around' the offending particle and sees what is behind it. One has to bear in mind that multiaperture eyes first evolved in the murky waters of primeveal ocean.

In case of the apposition eye, as shown in FIG. 3(c), one individual eyelet only will be affected by the scattered light and this will falsify the information concerning the object point. Therefore, to rectify this situation, the eye needs to be dithered, meaning the eye is slightly turned, so that each object point moves to the next eyelet. This is an operation in the time domain which corresponds to the same operation done in the spatial domain by the neural superposition eye.

Therefore, for non-natural systems, it will depend on the applications, what option for noise suppression, and what type of eye the designer will choose.

Referring again to FIG. 5 the optical system shown therein consists of a 2 mm diameter plano-convex lens 54 of 2 mm focal length and a 1 mm diameter plano-convex lens 53 having 1 mm focal length. Both can be moved in respect to each other, so that they can be arranged in the form of a Kepler telescope, which would form a real image in the detector plane. They can be arranged also with both focal points coinciding with overlapping focal length.

Of course, only in the Kepler telescope arrangement a sharp real image is achieved in the detector plane. However, some references claim that at least in some species the insect eye does not produce a sharp image. Maybe this is not required; maybe one eyelet produces, indeed, only one point of the overall image.

If this were the case, focusing of an image on the only detector available for this one point to be observed (if a fused rhabdom is assumed) is not as important as reducing the beam diameter as small as possible and entering the rhabdom under a small enough angle so that the light beam may experience as many total reflections as possible inside the rhabdom. A laser beam-spreader arrangement (which means coinciding focal points of two lenses of different sizes) would serve this purpose much better.

The detector system consists of a 7-piece bundle of optical fibers which will carry the light outside the eyelet where this fiber bundle can be spread apart into the individual fibers which can be connected to individual detectors. The fibers can be optically insulated from each other or not. Diameter of one fiber is 140 μm.

The analog output of the detectors can be digitized and manipulated in a computer.

The individual eyelets discussed above are arranged in a bundle. In one embodiment of the invention it is a bundle of seven, while in a second embodiment it is a bundle of close to 100.

Figure 14A:
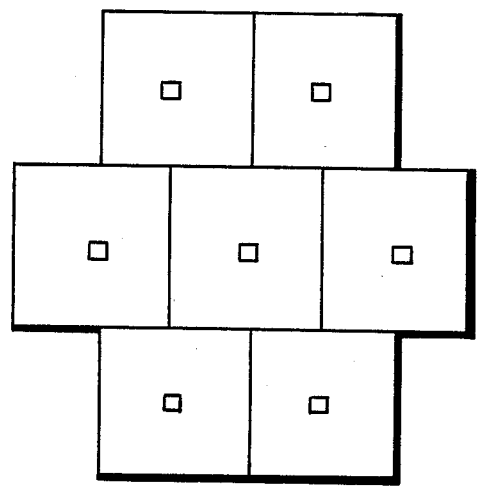
FIGS. 14a and 14b illustrate a display of 7 eyelets and the arrangement of 7 fibers in each eyelet.
Figure 14B:
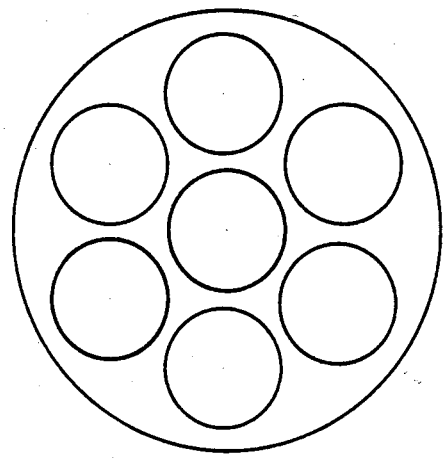
Figure 15A:
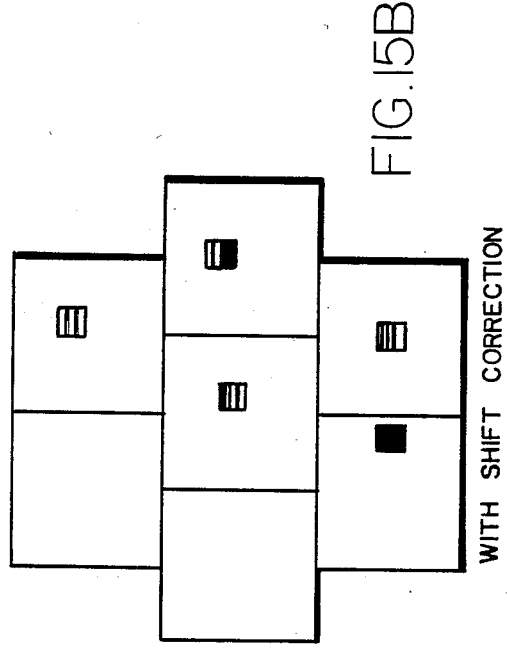
FIGS. 15a and 15b illustrate the display of 7 eyelets with shift correction and without shift correction.
Figure 15B:
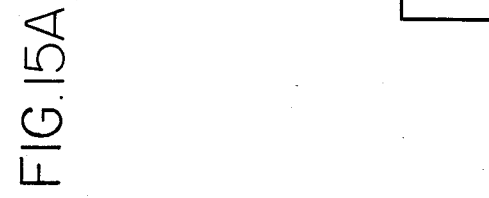

In such a device a possibility of correlation of signals coming from different eyelets can be studied. It is assumed that one eyelet produces only one point of the total image, and the centrally located one of the isolated rhabdomeres is used to detect this point. Then the other rhabdomeres are free for other tasks. This could be the detection of the first maximum of the interference pattern caused by the boundary of the lens, or just by determining the center of gravity of the blurr circle. If so, a determination of the location of e.g., an edge within the field of view of a particular eyelet can be made by analyzing the intensity distortions in the diffraction pattern. To achieve this it will be necessary to stop down the 2 mm lenses to a fraction of a millimeter. The signals coming from the detectors can be digitized and manipulated in a computer. The signals from the center fibers would be used to assemble a coarse image which can be displayed on a video terminal. The location of each picture point, which is as large in size, as the total field of view of an individual eyelet, can be better defined by checking the intensity distribution in the first maximum ring. That means the display point can be moved (slightly) into a location which corresponds better to the actual location of image point of a physical point source, which would create the particular diffraction pattern which was observed. The resulting image will be sharper than the original coarse image. FIG. 14(b) shows the arrangement of the seven fibers into a bundle. Each eyelet contains one of these bundles. Only the output at the center fiber is displayed on the left side in one of the squares. The squares of FIG. 14(a) represent the FOV of an individual eyelet and are assigned spaces on the video screen. The display point is free to move within the square as required. The intensity of the display point is coded as indicated on the Figure. Each square is fed by a different eyelet. If only the center fiber information is used the display points are automatically displayed on the center of the square. If the real point which creates the image point is not located on the axis of the eyelet, but towards the side of the field of view, the single detector could not tell the difference (only the intensity would be reduced somewhat, which, however, could have other causes), therefore, the display point has to be located in the center of the square for want of better information. However, if the information coming from the fibers surrounding the central fibers is used, it can be determined, using a proper algorithm, if the surrounding ring of the Airy disk is uneven in intensity, as the case would be if the real point were off axis. The additional information is not displayed on the screen but is used to move the display points somewhat so that its location on the screen corresponds better to the location where the image point of the real point should be. FIG. 15 shows the image of an edge. In FIG. 15(a) the display points are centered and in FIG. 15(b) the display points move to an improved location. If the real point is indeed a point (an object smaller than the field of view of an individual eyelet) with this signal processing, and improvement in resolving power can be achieved which goes beyond the theoretical resolving power of the eyelet. If the real point is a gray area which fills the whole field of view, (as a part of a big object) no improvement of resolving power occurs. The display points will remain centered in their squares, since the diffraction pattern will have a symmetrical intensity distribution. On the other hand, an improvement of resolution is not required in a case like this. Only the edges of a large object are of interest, and at the location of the edges there will be eyelets which have their field of view only partially filled. And here, of course, the improvement process will function again.

Figure 16A:
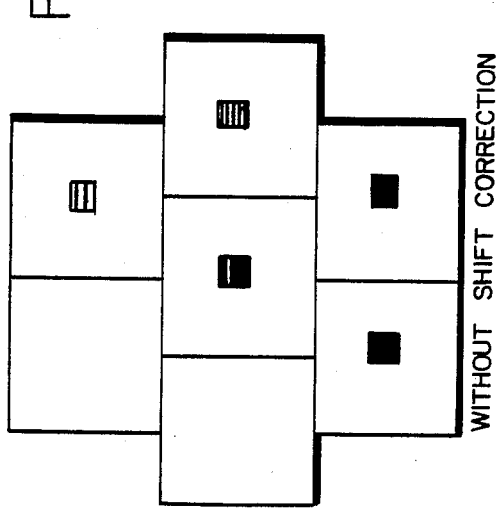
FIGS. 16a, 16b and 16c illustrate the reconstruction of an edge in a 7 eyelet display.
Figure 16B:
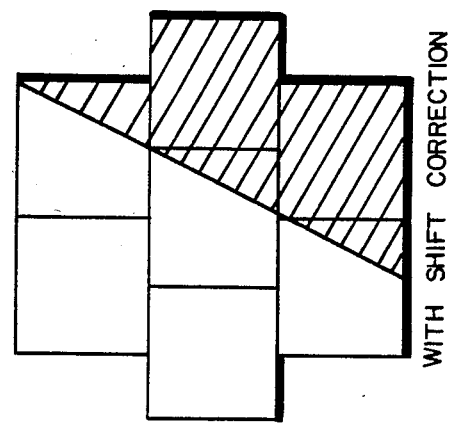
Figure 16C:
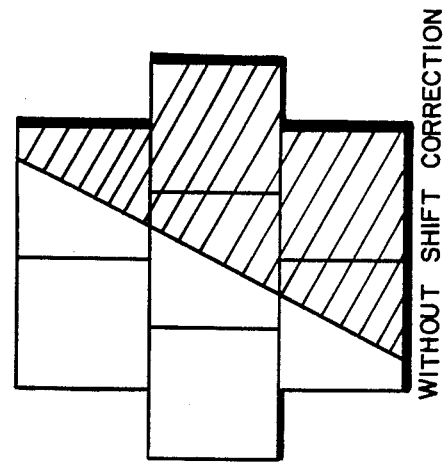

Of course it is possible to connect each point by a line and a perfect image of the edge is obtained. This is shown in FIG. 16 for both cases (with and without) shift correction. The difference in the slope of the lines caused by the shift correction is also shown.

Figure 17:
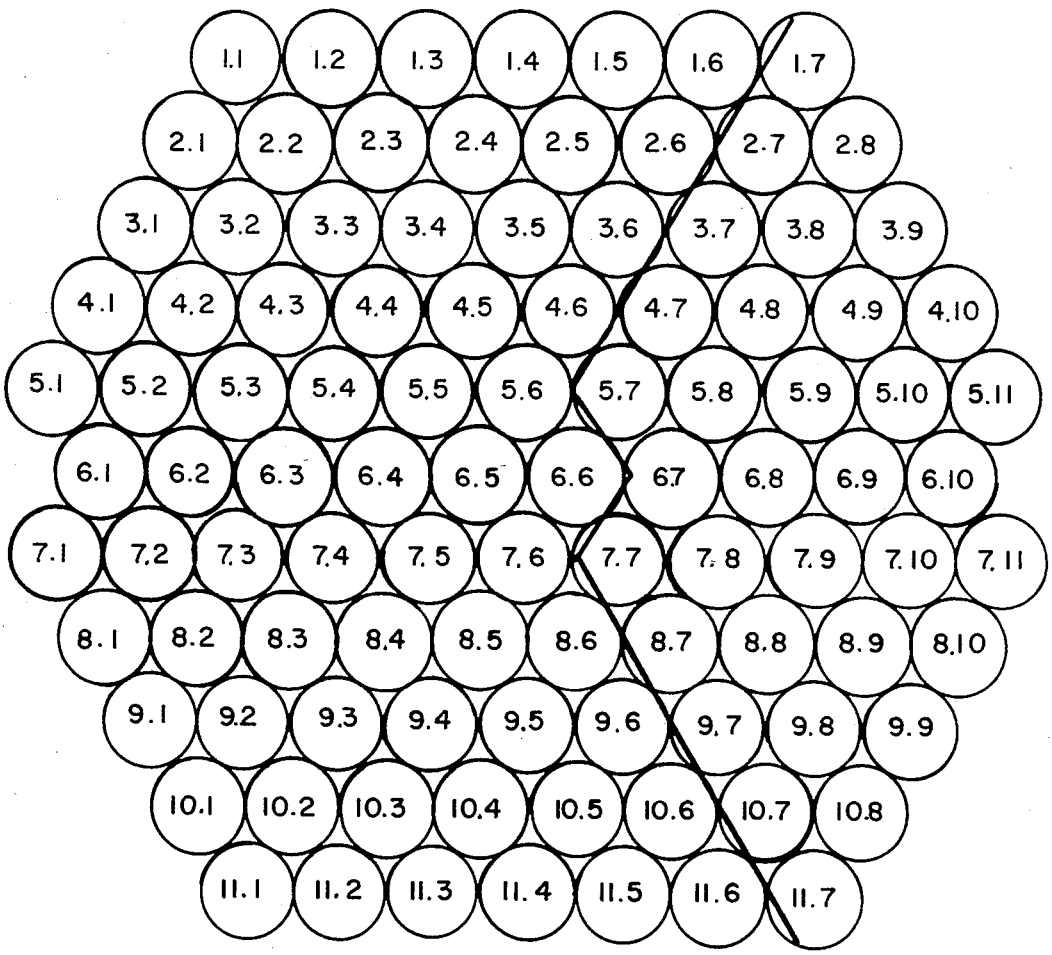
FIG. 17 illustrates the layout of a 100 eyelet array.

As it was shown above, even with only 7 eyelets a fairly good image of an edge can be obtained. For more complex images, of course, more than 7 eyelets are necessary. Also, if the principle of neural superposition is to be utilized more than 7 eyelets are necessary. The 100 eyelet embodiment is therefore divided into 68 neural superposition eyelets and 32 apposition eyelets. The neural superposition eyelets have a field of view of 12 degrees. Each optical axis is offset from its neighbor by 2 degrees with little overlap to the neighboring field of view. FIG. 17 shows this embodiment. In FIG. 17 all eyelets with a number 76 after the comma are apposition eyelets, the rest are neural superposition eyelets.

The design of the individual eyelets was already described above. The bundle of 7 optical fibers coming out of each eyelet is routed to a detector panel where each optical fiber is terminated at a solid state fiberoptic detector which produces an output voltage proportional to the light intensity entering the fiber. This output voltage goes through a calibration potentiometer (FIG. 8) which allows for adjustment of each one of the fibers for equal output when the complete eye is viewing a uniform light source (no object of recognition). The output of each calibration potentiometer is fed to one channel of a 658 channel analog multiplexer which sequentially scans 658 fibers. FIG. 8 shows the block diagram of the multiplexer. The scan rate is adjustable by changing the clock frequency of the counter which drives the multiplexers.

Since only one channel is turned on at a time, all multiplexer channel outputs are tied to one common output which is amplified and then externally fed to the computer analog-to-digital converter. The clock which causes the multiplexer to scan is also externally connected to the A-D converted to maintain synchronous operation. The output voltage of the particular channel being sampled is displayed by a front panel digital voltmeter.

Counter and front panel digital readouts are also provided to indicate which eyelet and which fiber within that eyelet is being sampled. Additional front panel controls enable manual or automatic channel advance, reset to channel 0, single or continuous sweep modes, and start and stop of the sweep.

Of course it should be noted that the multiplexer is only used in order to be able to utilize a microcomputer (HP85) as it exists. The desirable situation would, of course, be to feed each detector output directly (and parallel) into a memory location. One of the next steps is to built or find a microcomputer which has 1000 input ports.

The presently described embodiment of the invention, however, calls for sequential readout of each detector, which means only still pictures can be processed. FIG. 7 gives a simplified flow diagram at the present set-up. The initial noise suppression is done by thresholding only as it was demonstrated in FIG. 9.

From here on either the apposition part or the neural superposition part of the eye can be used. The functioning of the apposition eye has already been described with the 7 eyelet model. The shift correction, which may or may not be applied is one of the subroutines. Another subroutine would be to connect all points with lines and display the result on the video screen. In the next step, the 'Cortical Processing' the coefficients which were computed with a subroutine are matched with stored coefficients and conclusion are drawn. For operation of the neural superposition part of the eye a neural superposition mask (FIG. 18) has to be applied to the acquired image matrix.

Figure 19:
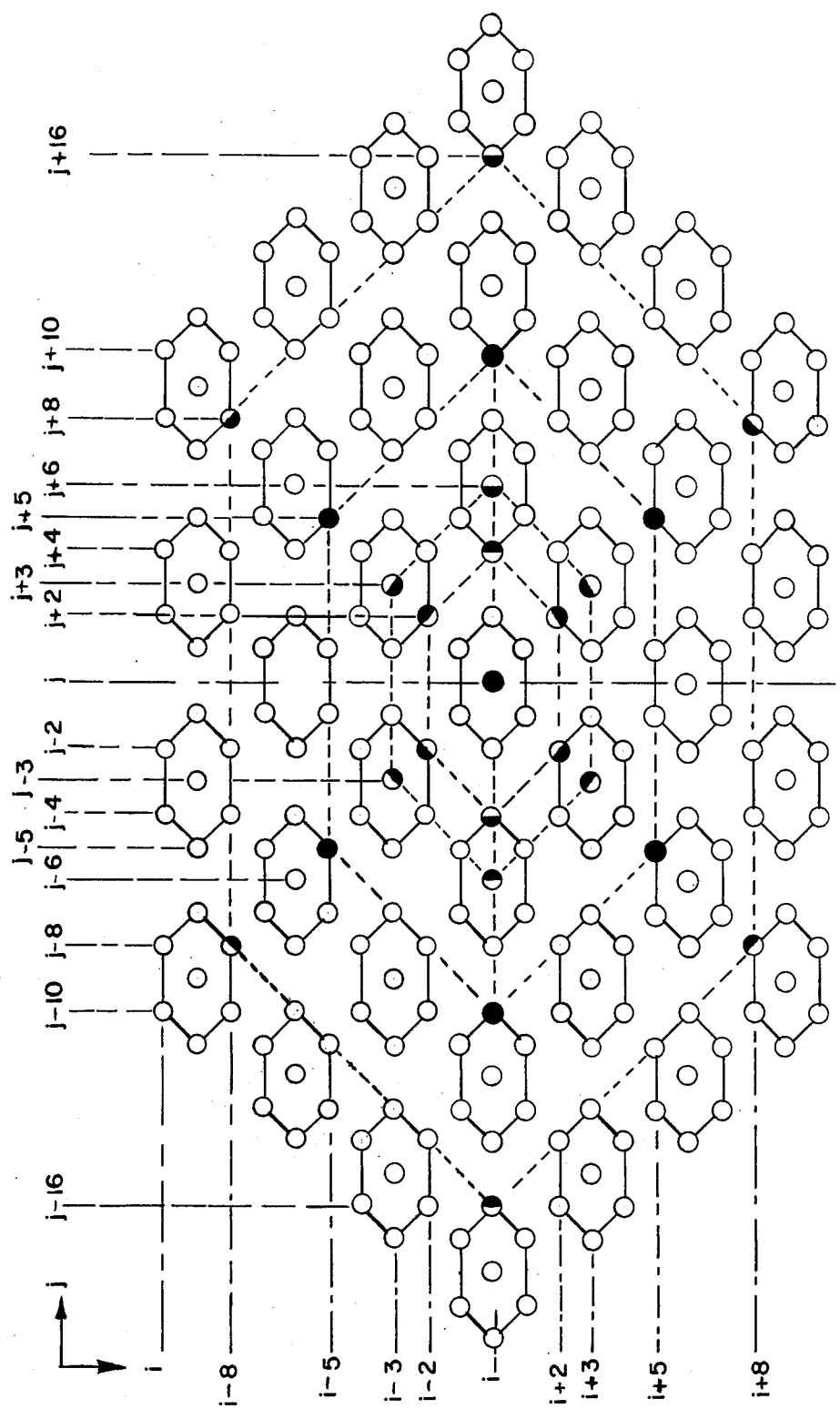
FIG. 19 illustrates neural superposition of eyelets with a FOV=12°, 2° off from the optical axis of the neighboring eyelets.

Since the neural superposition eyelets have a field of view of 12°, and the optical axis of each eyelet forms an angle of 2° with the optical axis of the neighboring eyelet, an image organization as indicated in FIG. 19 is obtained. The neural superposition image of the (i,j) the neural-commatidium will be:

$$I_{i,j} = I_{i,j} +$$
$$w1 \times (\tfrac{1}{2} I_{i+2,j-2} + \tfrac{1}{2} I_{i,j-4} + \tfrac{1}{2} I_{i-2,j-2} +$$
$$\tfrac{1}{2} I_{i-2,j+2} + \tfrac{1}{2} I_{i,j+4} + \tfrac{1}{2} I_{i+2,j+2}) +$$
$$w2 \times (\tfrac{1}{2} I_{i+3,j-3} + \tfrac{1}{2} I_{i,j-6} + \tfrac{1}{2} I_{i-3,j-3} +$$
$$\tfrac{1}{2} I_{i-3,j+3} + \tfrac{1}{2} I_{i,j+6} + \tfrac{1}{2} I_{i+3,j+3} +$$
$$w3 \times (\tfrac{1}{2} I_{i+4,j-5} + \tfrac{1}{2} I_{i,j-10} + I_{i-4,j-53} +$$
$$I_{i-4,j+5} + I_{i,j+10} + w4 \times (\tfrac{1}{2} I_{i+8,j-8} +$$
$$\tfrac{1}{2} I_{i,j-16} + \tfrac{1}{2} I_{i-8,j-8} + \tfrac{1}{2} I_{i-8,j+8} +$$
$$\tfrac{1}{2} I_{i,j+16} + \tfrac{1}{2} I_{i+8,j+8})$$

where w1, w2, w3, w4 in the above equation are weighing functions which are determined by the sensitivity of the eye.

Figure 18:
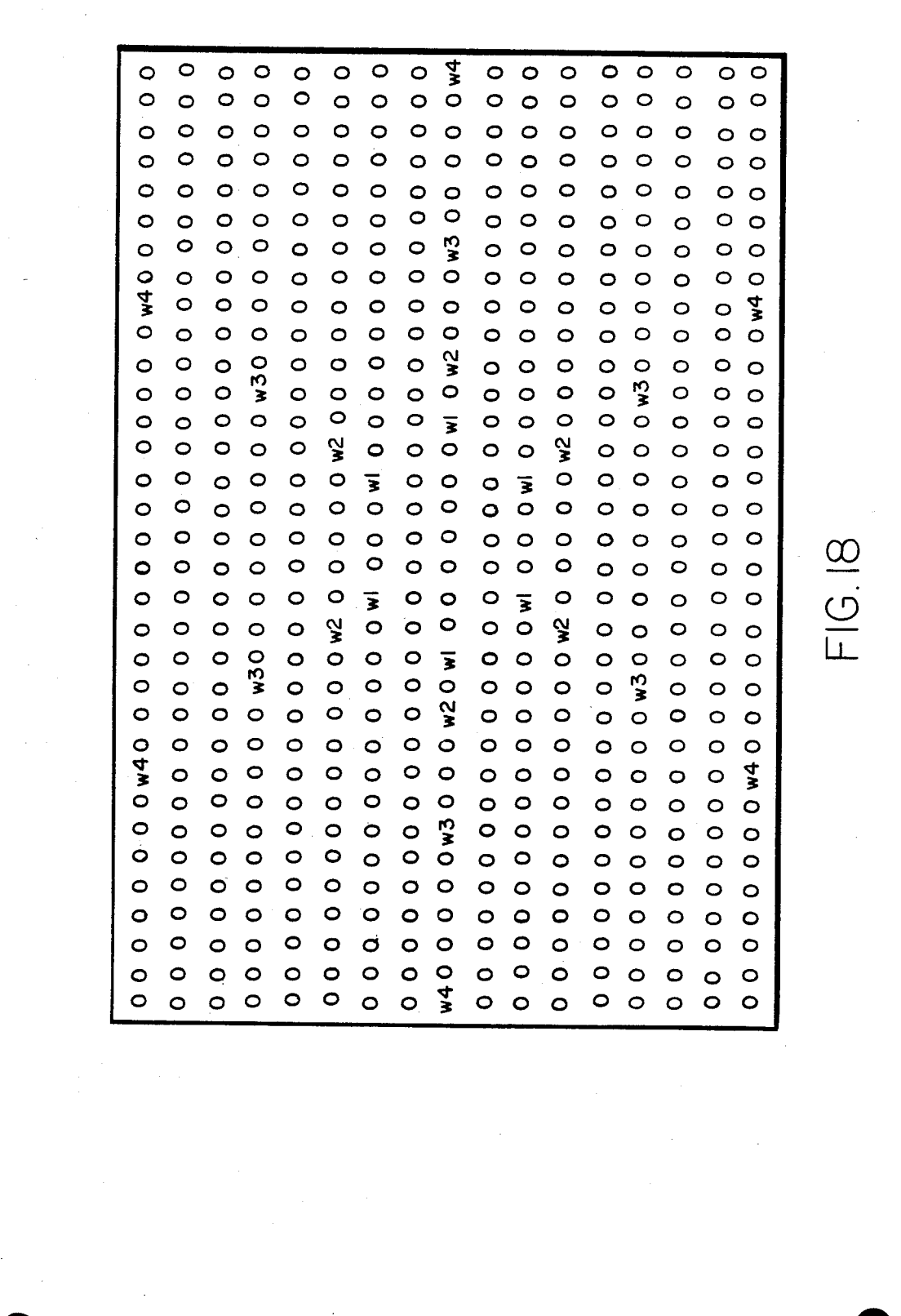

NSP (Neural Superposition) processing is performed by convolving the image of the detector array (FIG. 19) with the above NSP mask (FIG. 18).

The neural superposition consists of superimposing the NSP mask over a portion of the original image, multiplying each fiber element by the corresponding mask element, summing the products, then creating in a new matrix a new image element whose location corresponds to the element forming the center of the NSP mask. The mask is moved over each element of the original image matrix and the procedure repeated to create the neural superposition image point by point.

The major advantage of neural superposition is obvious if it is realized that there are 25 statistically independent detectors which are seeing the same object simultaneously and this information is used to determine just one image point.

Figures 20, 21:
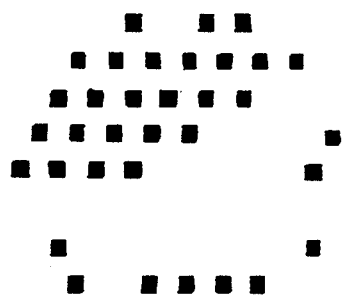
FIG. 20 illustrates an original and a neural superpostion matrix.
FIG. 21 is a representation by dots of a neural superposition eye.

As a practical example, again an edge is detected FIG. 20 shows the original image matrix and the result of the neural superposition procedure. Due to the limited screen size it is not advantageous to display the 2nd and 3rd decimal point, although it is stored in the machine. For this reason the image points are again shown as dots in FIG. 21. The edge can now be discovered which is the boundary line between an illuminated field and on a dark field. One row of eyelets is inoperative for yet undetermined reasons. The illuminated points at the boundary of the eye stem from a software imperfection. Since these eyelets are at the very boundary of the total eye, they do not have the benefit of information input of more eyelets to the right. Therefore, not all weighing functions are available and the ones which are available are influenced by the bright points to the left.

Therefore, for all points which are computed with an incomplete NSP mask a correction would have to be applied. It is known from experiments with the horseshoe crab that each detector which receives a strong signal, has the power to inhibit other neighboring detectors so they become less sensitive. The degree of inhibition decreases with distance. Examining the weight functions it can be seen that the (many) weight functions to the left of the center of the NSP mask could be brought in equilibrium with (the few) weight functions on the right side of the NSP mask for these boundary points, by reducing the weights on the left in an analog fashion.

The next step is to detect the edge with the previously described edge detection scheme. The result is seen in FIG. 22 in dot representation and line representation. Examining the neural superposition process closer, it is realized that always two parallel rows of eyelets will detect the edge. Therefore, the line representation should account for this fact. This had been done in FIG. 23. The correct interpretation of the dot representation is shown, which amounts to two edges. The true location of the edge must be between the two which is indicated in FIG. 23, type B.

Figure 24:
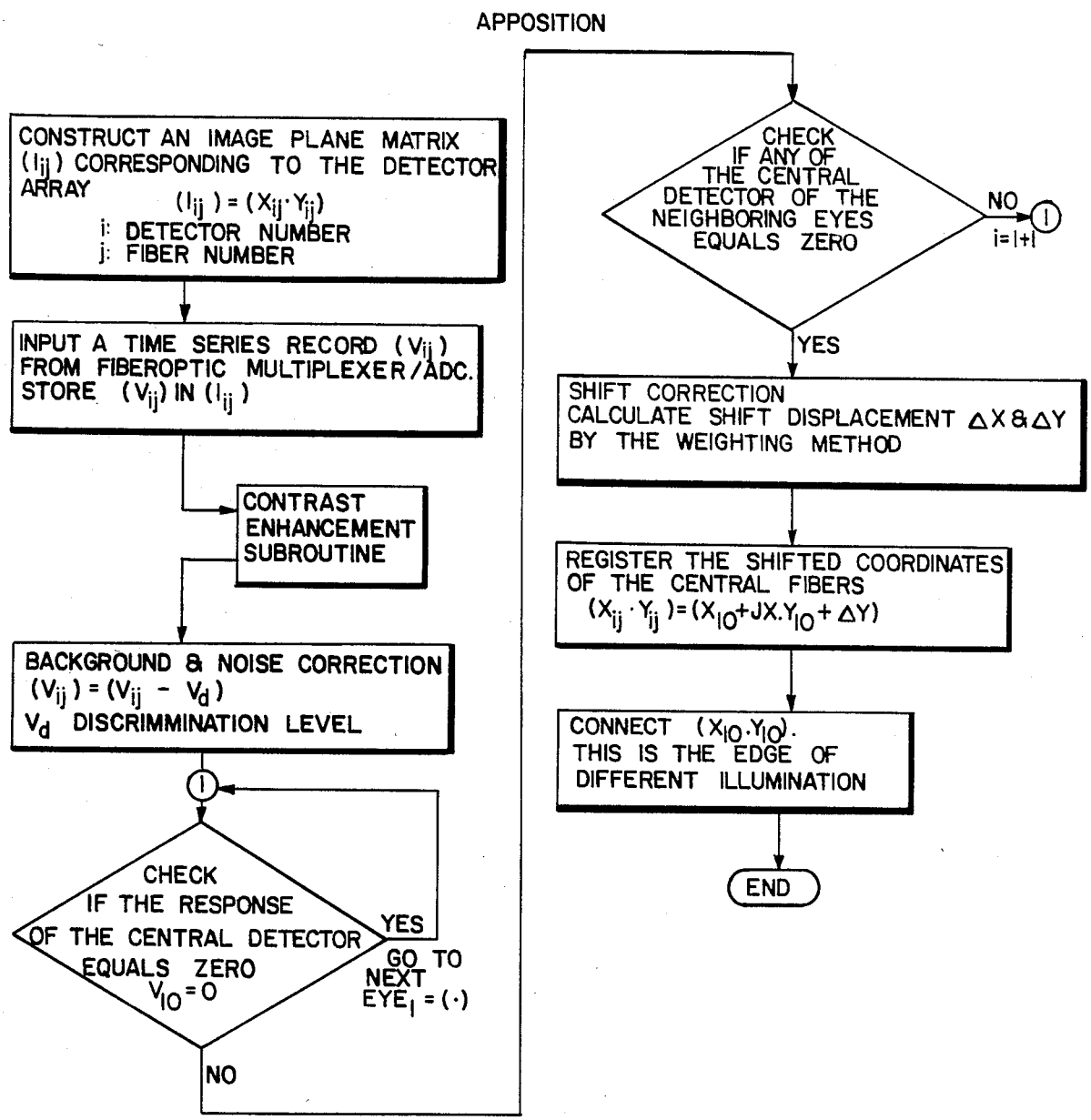
FIG. 24 is a algorithm for an apposition eye.
Figure 25:
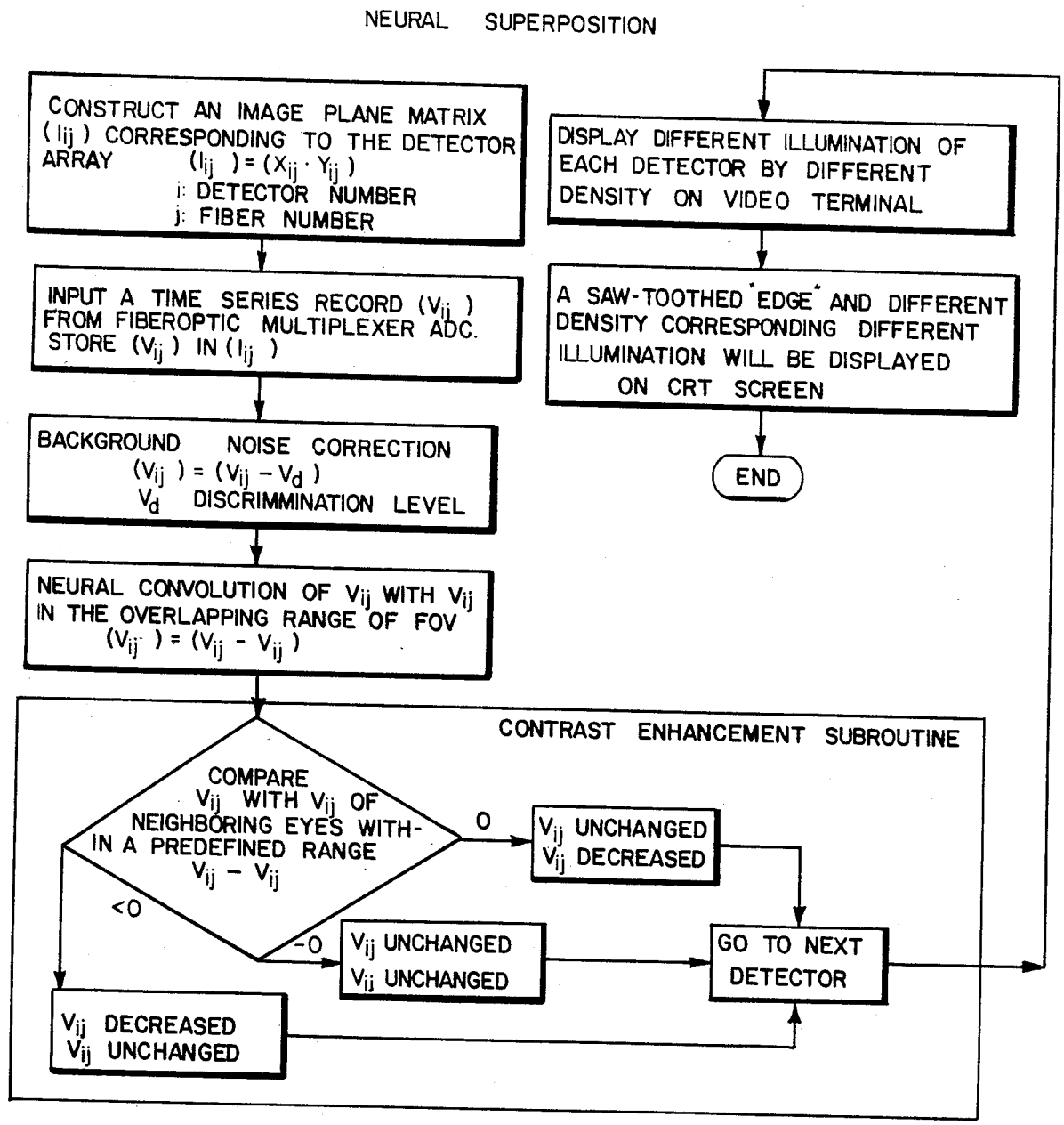
FIG. 25 is an algorithm for a neural superposition eye.

The algorithm used for the apposition eye is shown in FIG. 24 and the algorithm for the neural superposition eye in FIG. 25. Both algorithms use the same subroutine for contrast embodiment.

As indicated above the utility of the invention applies to applications such as air-to-air missiles, air-to-ground missiles, ground-to-air missiles, robots, space based sensors, and security surveillance cameras.

What all of these applications have in common is that the shape of the target is known beforehand. In the case of the security surveillance camera, the environment it is supposed to survey is known and an intruder constitutes a change in this environment and is so detected. This shape is of minor importance, the major importance is the fact that he is there, and where he is. If a picture of him is also desired the above information can be used to direct a regular (roving) camera to him. The multiaperture security surveillance camera has a 360° field of view and is of course non-roving.

Similarly for missiles in the initial stages of guidance, it is important to know where the target is and it is not so important what the exact shape of the target is. The approximate shape of the target is known beforehand. Also, for a robot on the production line which has to pick up a certain part and install it, the shape of the target is known beforehand. Even if it should be a complex shape it can be approximated with a simple but target specific shape, so that the robot will find the correct part.

From the above discussion, it is evident that not only shape but other properties of the target should be used to identify the target. For instance, if the robot on the production line has to pick up amongst other things both ⅜ inch and ½ inch nuts, which look alike, except for their size, it would be advantageous to paint one kind of nut red, and the other green, and check for color in the identification process, rather than try to measure the size of the nut and base and identification on this.

In case of a neural superposition eye where several sensors look at the same point in space, some of the sensor can be used for shape and the others can be used for color detection.

While the invention has been described in its preferred embodiments, it is understood that the words which have been used are words of description rather than words of limitation and that changes within the purview of the appended claims may be made without departing from the scope and spirit of the invention in its broader aspect.

What is claimed is:

1. An integrated multiaperture optical system for viewing a scene, forming an image thereof and detecting and identifying targets therefrom, said optical system comprising;
   a two dimensional array of lens aperture menbers, each said lens aperture member comprising a cylindrical member having first and second lenses disposed therein, said lenses being spaced apart and movable along the major axis of said cylindrical member, each said lens aperture member being oriented to direct electromagnetic wave energy from a discrete region of said scene to a discrete portion of a common locus, the organization and arrangement of said lens aperture members being such that individual discrete portions of the common locus defined by adjacent lens aperture members are substantially contiguous and, collectively, the total of said discrete portions receive electromagnetic wave energy from the total scene being viewed, whereby a quantized replica of said scene is displayed on said common locus,
   detector means located at said locus and receiving electromagnetic wave energy from said lens aperture members, said detector means comprising a multi-element detector for each said lens aperture member, each element of each said multi-element detector generating data signals in response to received electromagnetic wave energy,
   a correlation circuit having a memory for each element of each said multi-element detector, each said memory receiving and storing data from its associated detector element, and
   computer means having a memory matrix, said memory matrix receiving and storing data from said correlation circuit memories and said computer means processing the data stored in said memory matrix.

2. An integrated multiaperture optical system as defined in claim 1 wherein said correlation circuit includes, in combination with each memory,
   an amplifier receiving and amplifying the detector element output, and
   an analog/digital converter receiving and digitizing the output of said amplifier, the digitized output thereof being read into its associated memory.

3. An integrated multiaperture optical system as defined in claim 2 wherein said correlation circuit is a large scale integrated circuit.

4. An integrated multiaperture optical system as defined in claim 3 wherein each correlation circuit memory is physically located below and in close proximity to its associated detector element.

5. An integrated multiaperture optical system as defined in claim 1 wherein said memory matrix contains a look-up table of selected object identification numbers, and said computer means constructs image edge line representations from data in said correlation circuit memories and effects identification of correlations thereof with object identification numbers.

6. An integrated multiaperture optical system as defined in claim 5 wherein said multiple element detectors form a matrix in correlation with said array of lens aperture member and each said object identification number is a function of a selected object edge line representation with elements of said multiple element detector matrix.

7. An integrated multiaperture optical system as defined in claim 1 wherein at least some of said lens aperture members have an optical configuration and orientation adapted to form an apposition image at said locus.

8. An integrated multiaperture optical system as defined in claim 1 wherein at least some of said lens aperture members have an optical configuration and orientation adapted to form a neural superposition image at said locus.

* * * * *